US009986480B2

(12) United States Patent
Ta et al.

(10) Patent No.: US 9,986,480 B2
(45) Date of Patent: May 29, 2018

(54) COMMUNICATIONS RELATED METHODS AND APPARATUS

(71) Applicant: M87, Inc., Austin, TX (US)

(72) Inventors: Tuan Ta, Austin, TX (US); Vidur Bhargava, Austin, TX (US)

(73) Assignee: M87, Inc., Austin, TX (US)

( * ) Notice: Subject to any disclaimer, the term of this patent is extended or adjusted under 35 U.S.C. 154(b) by 0 days. days.

(21) Appl. No.: 15/224,375

(22) Filed: Jul. 29, 2016

(65) Prior Publication Data
US 2017/0041845 A1 Feb. 9, 2017

Related U.S. Application Data

(60) Provisional application No. 62/201,508, filed on Aug. 5, 2015.

(51) Int. Cl.
*H04W 36/00* (2009.01)
*H04W 36/14* (2009.01)
*H04W 48/10* (2009.01)
*H04W 48/16* (2009.01)
*H04W 36/32* (2009.01)

(52) U.S. Cl.
CPC .......... *H04W 36/14* (2013.01); *H04W 48/10* (2013.01); *H04W 48/16* (2013.01); *H04W 36/32* (2013.01)

(58) Field of Classification Search
CPC ..... H04W 36/14; H04W 36/32; H04W 48/10; H04W 48/16
See application file for complete search history.

(56) References Cited

U.S. PATENT DOCUMENTS

| 9,125,113 | B2 * | 9/2015 | Prasad | H04W 36/0088 |
| 9,307,476 | B2 * | 4/2016 | Peng | H04W 36/32 |
| 9,370,476 | B2 * | 6/2016 | Kleinberg | A61K 9/0014 |
| 2004/0235489 | A1 * | 11/2004 | Kwon | H04W 88/04 455/452.2 |
| 2006/0114849 | A1 | 6/2006 | Avinash | |
| 2008/0037525 | A1 | 2/2008 | Karaoguz et al. | |
| 2008/0109302 | A1 | 5/2008 | Salokannel et al. | |
| 2014/0254582 | A1 | 9/2014 | Singh et al. | |

(Continued)

OTHER PUBLICATIONS

Notification of Transmittal of The International Search Report and The Written Opinion of the International Searching Authority or the Declaration, International Search Report and Written Opinion of the International Searching Authority from PCT/US2016/045054, dated Oct. 27, 2016, 1-7 pages.

*Primary Examiner* — Wayne H Cai
(74) *Attorney, Agent, or Firm* — Straub & Straub; Michael P. Straub; Stephen T. Straub

(57) ABSTRACT

Methods and apparatus for efficiently communicating network connectivity information in a communications system are described. Two types of signals with different characteristics, e.g., long range synchronous beacons, e.g., LTE-D beacons, and short range asynchronous beacons, e.g., WiFi beacons, are used in combination to advertise network connectivity information and accelerate the acquisition of a routing path for a communications device to a device serving as a gateway for a infrastructure network. Reception of a first type signal triggers monitoring for a second type signal, and a received second type signal communicates information used to determine a communications path to a gateway device.

20 Claims, 18 Drawing Sheets

(56) References Cited

U.S. PATENT DOCUMENTS

2016/0014664 A1* 1/2016 Singh .................. H04W 36/14
370/332
2016/0095117 A1* 3/2016 Doppler .............. H04W 56/001
455/454

* cited by examiner

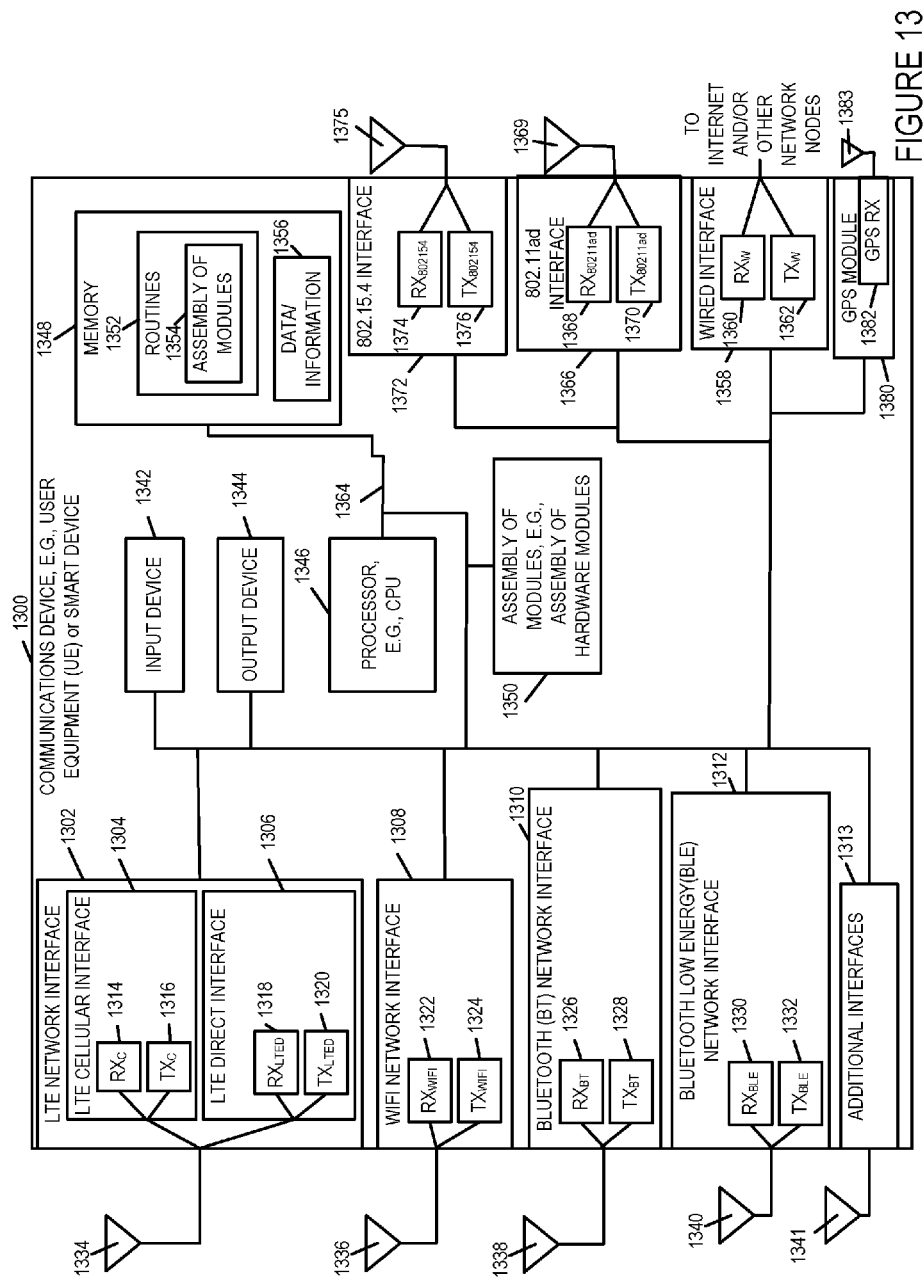

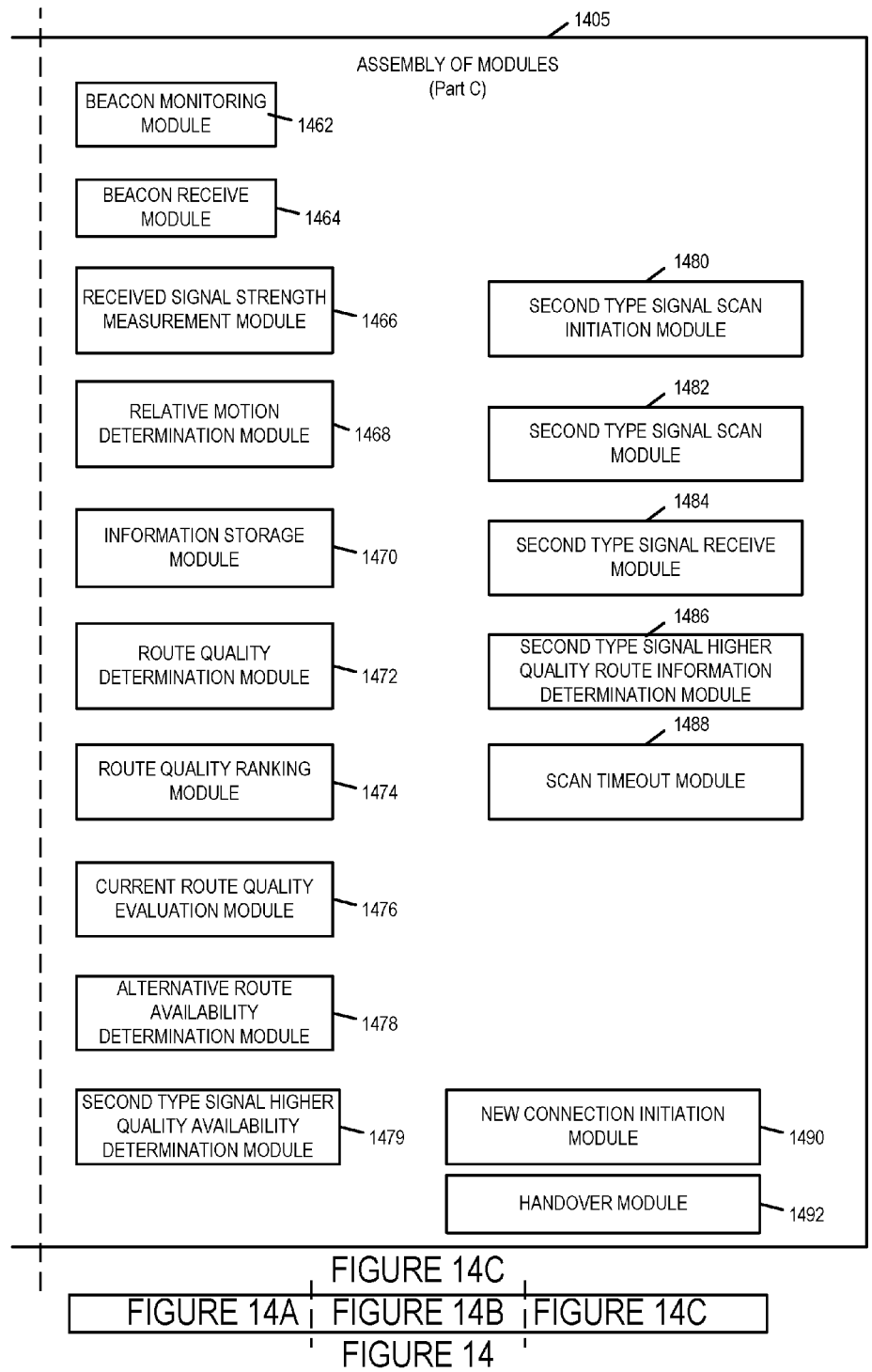

COMMUNICATIONS RELATED METHODS AND APPARATUS

RELATED APPLICATIONS

The present application claims the benefit of U.S. Provisional Patent Application Ser. No. 62/201,508 filed Aug. 5, 2015 which is hereby expressly incorporated by reference in its entirety.

FIELD

Various embodiments relate to methods and apparatus establishing and/or using communications connections in networks, and more particularly, to efficiently establishing, updating and/or changing a device to device communications path.

BACKGROUND

There is an ever increasing demand for deploying and using device to device communications networks as more devices are produced to include communications capabilities, e.g., with multiple alternative interfaces, and new applications are offered. In addition, there are benefits in terms of cost, interference, and/or security to keeping signaling local and operating at low power levels. Therefore, a communications device may desire to communicate using device to device signaling wherever possible. There may be alternative potential gateways, e.g., with different quality metrics, in a local area that a communications device may be able to use to access an infrastructure network, e.g. cellular network. It would be beneficial for a communications device to be able to quickly and efficiently locate a currently best device to device communications path to the infrastructure network.

Because of the dynamic nature of many device to device networks and the uncertainty of number of potential communications devices that may be operating a local area at a given time, efficiently determining routing can be problematic, e.g., as communications devices move and communications devices may change their operational status. It is desirable to limit the time and energy that a communication device needs to expend on searching for information used to establish and maintain a communications path.

In view of the above it should be appreciated that there is a need for improved methods and/or apparatus relating to signaling used for initiating or establishing a communications path, and/or methods and apparatus for communications path establishment and/or maintenance.

SUMMARY

Infrastructure network connectivity information is advertised via two types of signals, a first type signal, e.g., a long range broadcast signal and a second type signal, e.g., a short range broadcast signal. In some embodiments, the long range signal is a long range beacon signal, e.g., an LTE-D beacon, and the short range signal is short range beacon signal, e.g., a WiFi beacon. Various exemplary methods and apparatus relate to accelerating data path establishment, while limiting power consumption, by efficiently using a combination of first and second type signals, said first and second type signals having different characteristics. Some exemplary methods and apparatus are directed to enabling efficient handover of a communications device between different portions of a network corresponding to different gateway devices.

An exemplary communications method of operating a first communications device, in accordance with some embodiments, includes: receiving a first first type signal transmitted by an advertising device, said first first type signal advertising infrastructure network connectivity information corresponding to the advertising device; and initiating scanning for a second type signal in response to receiving said first first type signal. An exemplary first communications device, in accordance with some embodiments, includes: a first type signal interface configured to receive a first first type signal transmitted by an advertising device, said first first type signal advertising infrastructure network connectivity information corresponding to the advertising device; a first type signal information recovery module configured to recover information communicated in received first first type signal, said information including infrastructure network connectivity information; and a second type signal scan initiation module configured to initiating scanning for a second type signal in response to receiving said first first type signal.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 10 comprises the combination of FIG. 10A, FIG. 10B and FIG. 10C.

FIG. 13 is a drawing of an exemplary communications device, e.g., a first communications device, implemented in accordance with an exemplary embodiment.

FIG. 14C is a third part of an assembly of modules which may be included in the exemplary communications device of FIG. 13.

FIG. 14 comprises the combination of FIG. 14A, FIG. 14B and FIG. 14C.

DETAILED DESCRIPTION

Figure 1:
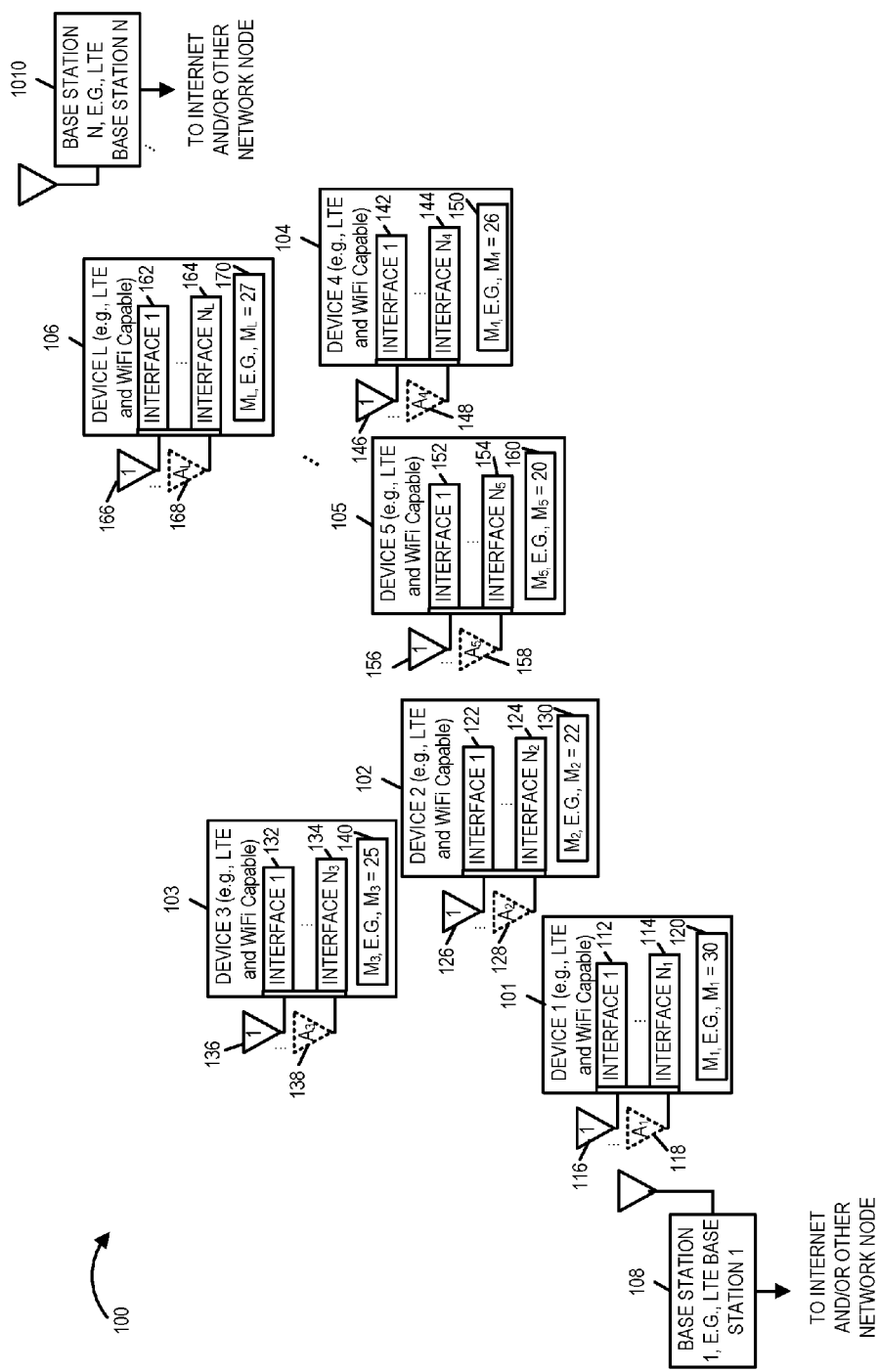
FIG. 1 is a drawing of an exemplary communications system including a plurality of communications devices, supporting device to device communications, and a plurality of base stations, at least some of the communications devices may serve as gateway devices and couple a device to device network to a base station.

FIG. 1 is a drawing of an exemplary communications system 100 including a plurality of communications devices (device 1 101, device 2 102, device 3 103, device 4 104, device 5 105, ..., device L 106), and a plurality of base stations (base station 1 108, ..., base station N 1010). The base stations (108, 110) are, e.g., LTE base stations. Each of the base stations (108, 110) are coupled to the Internet and/or other network nodes, e.g., via a backhaul network. Each of the communications devices (device 1 101, device 2 102, device 3 103, device 4 104, device 5 105, ..., device L 106) includes a plurality of wireless interfaces ((interface 1 112, ..., interface $N_1$ 114), (interface 1 122, ..., interface $N_2$ 124), (interface 1 132, ..., interface $N_3$ 134), (interface 1 142, ..., interface $N_4$ 144), (interface 1 152, ..., interface $N_5$ 154), ..., (interface 1 162, interface $N_L$ 164), respectively. Each of the communications devices (device 1 101, device 2 102, device 3 103, device 4 104, device 5 105, ..., device L 106) includes one or more antennas ((antenna 1 116, ..., antenna $N_1$ 118), (antenna 1 126, ..., antenna $N_2$ 128), (antenna 1 136, ..., antenna $N_3$ 138), (antenna 1 146, ..., antenna $N_4$ 148), (antenna 1 156, ..., antenna $N_5$ 158), ..., (antenna 1 166, interface $N_L$ 168), respectively. In some embodiments, different communications devices include different number of wireless interfaces and/or different numbers of antenna. In some embodiments, the same antenna is used for multiple wireless interfaces. In some embodiments multiple antennas are used for a single wireless interface. In some embodiments, the same antenna or same set of antennas are used for a plurality of wireless interfaces in a communications device.

In some embodiments, the communications devices (device 1 101, device 2 102, device 3 103, device 4 104, device 5 105, ..., device L 106) support both LTE and WiFi communications. In various embodiments, the communications devices (device 1 101, device 2 102, device 3 103, device 4 104, device 5 105, ..., device L 106) support the capability to send and receive two types of beacon signals with different ranges, e.g., LTE-D beacon signals and WiFi beacon signals, with the LTE-D beacon signals having a longer range than the WiFi beacon signals.

The communications devices (device 1 101, device 2 102, device 3 103, device 4 104, device 5 105, ..., device L 106) each have a signal quality metric ($M_1$ 120, $M_2$ 130, $M_3$ 140, $M_4$ 150, $M_5$ 160, ..., $M_L$ 170) indicative of the device's signal quality with regard to serving as a gateway, e.g., a gateway between a device to device network and a base station, e.g., a LTE base station. Thus, in some embodiments, the signal quality metric is an indication of the quality of the wireless communications channel between the device and a base station in a cellular network, e.g. an LTE network. As a communications device changes its location, its signal quality metric changes, e.g., a device very close to a base station, e.g., an LTE base station, will typically have a higher signal quality metric than a device far away from a base station.

In the example of FIG. 1, the communications devices (device 1 101, device 2 102, device 3 103, device 4 104, device 5 105, ..., device L 106) currently have a signal quality metric ($M_1$=30, $M_2$=22, $M_3$=25, $M_4$=26, $M_5$=20, ..., $M_L$=27). Device 1 101 with the highest signal quality metric is considered the top gateway. At another time, e.g., with the communications devices at different locations with regard to the base stations, a different communications device may have the highest signal quality metric and may be considered the top gateway.

In various examples described below exemplary LTE-D beacons and exemplary WiFi beacons are used. The differences between the two types of exemplary beacons are included in the following Table. The exemplary values shown are used in some, but not necessarily all embodiments.

| WiFi | LTE-D |
|---|---|
| Asynchronous: | Synchronous: |
| Reception (scanning) takes longer | Reception takes very short time |
| Longer interval between scans (40-60 s) | Shorter interval between reception opportunities (2.5-10 s) |
| Short range | Long range |
| Easier to provide data path | Harder to provide data path |

Various methods and apparatus, in accordance with the present invention, are applicable to other types of beacons, e.g., with the above properties or with similar properties. Thus some embodiments use WiFi and LTE-D beacons. Some other embodiments use a different pair of beacon types, e.g., Bluetooth and LTE-D beacons.

In various embodiments, data path establishment on asynchronous interface is accelerated by using synchronous beacons. Beacons, and the physical interfaces carrying them, can be categorized into asynchronous (e.g. wifi, Bluetooth) and synchronous (e.g. LTE-D). Asynchronous beacons usually, but not always, operate in a distributed manner on unlicensed spectrum. Their advantage is that they are unregulated and can be transmitted frequently. However, the receivers do not know when transmission happen, thus the receivers need to spend more time scanning, e.g., expending power scanning. To avoid major impact on battery life, mobile devices typically need to allow a long period between scan intervals. As a result, it can take a long time before an update sent on asynchronous beacons is received and recovered by nearby devices.

On the other hand, synchronous beacons usually operate in a controlled or semi-controlled manner. Participating devices need to have a common timing source, and a method to agree on beaconing instants (opportunities). GPS and cellular timing are the two most popular timing sources. GPS is free, however it lacks indoor coverage. Cellular timing is therefore the most ubiquitous, especially for terrestrial mobile devices. The advantage of synchronous beacons is that the receivers wake up at a predetermined instant, listen for beacons, and can quickly go back to sleep. As a result, mobile devices can allow shorter period between listening intervals without major impact on battery life.

The disadvantage of synchronous beacons is that they often operate on licensed spectrum, which is limited and of high demand. Direct communication on the same interface as synchronous beacons is therefore usually not available. Once the devices discover each other, they need to go over the top (through the core network and some time the Internet) to communicate.

Various exemplary embodiments are directed to exemplary methods and apparatus utilize synchronous beacons to accelerate the establishment of data path on asynchronous interface.

In examples described below corresponding to FIGS. 2-5, practical values that have been tested in the field in an exemplary product are used. In other embodiments, different values may be, and sometimes are, used. Consider for the examples that WiFi transmitters send beacons every 100 ms. Further consider that WiFi receivers wake up to scan for beacons every 60 s. Further consider that LTE-D transmitters and receivers synchronously send/receive beacons every 10 s.

In FIGS. 2-5, M represents the signal quality metric for each device. The signal quality metric for a communications device is an indicator of signal quality between the communications device, which may serve as a gateway for a network, e.g., a localized device to device network, and a cellular base station, e.g., an LTE base station. Wireless terminal (WT) 1 201 has a signal quality metric M=30, as indicated by box 205; WT 2 203 has a signal quality metric M=25, as indicated by box 206; WT 3 203 has a signal quality metric M=20, as indicated by box 207; WT 4 204 has a signal quality metric M=22, as indicated by box 208. WT 1 201 has the highest quality metric (M=30), and therefore is the top gateway. Other devices, which can establish a data path to WT 1 201 on WiFi, beacon out a tuple (M, H, RID). Where M is the signal quality metric of WT 1 201, H is the hop count from the beaconing device to a base station via device WT 1 201 acting as a gateway, RID is the routable ID of device 201. Consider that the routable ID of WT 1 201=201. For example, WT 2 202, which has local signal quality metric of 25 (less than 30), beacons out on WiFi (M=30, H=2, RID=201).

Figure 4:
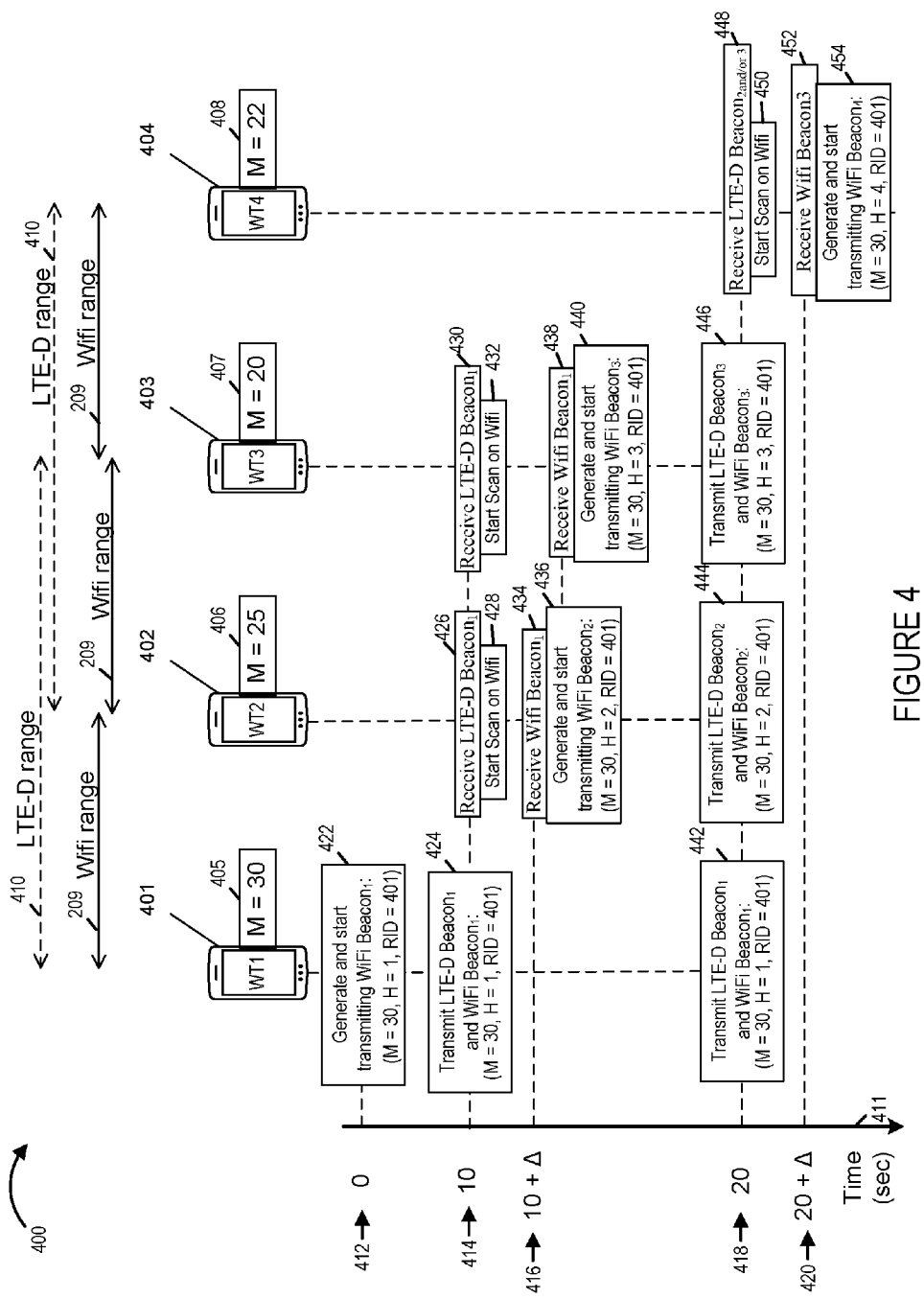
FIG. 4 illustrates a worst case scenario corresponding to the speed at which a data path on WiFi interface can be established from device WT 4 to the top gateway WT 1 401 using LTE-D beacons in combination with WiFi beacons.
Figure 5:
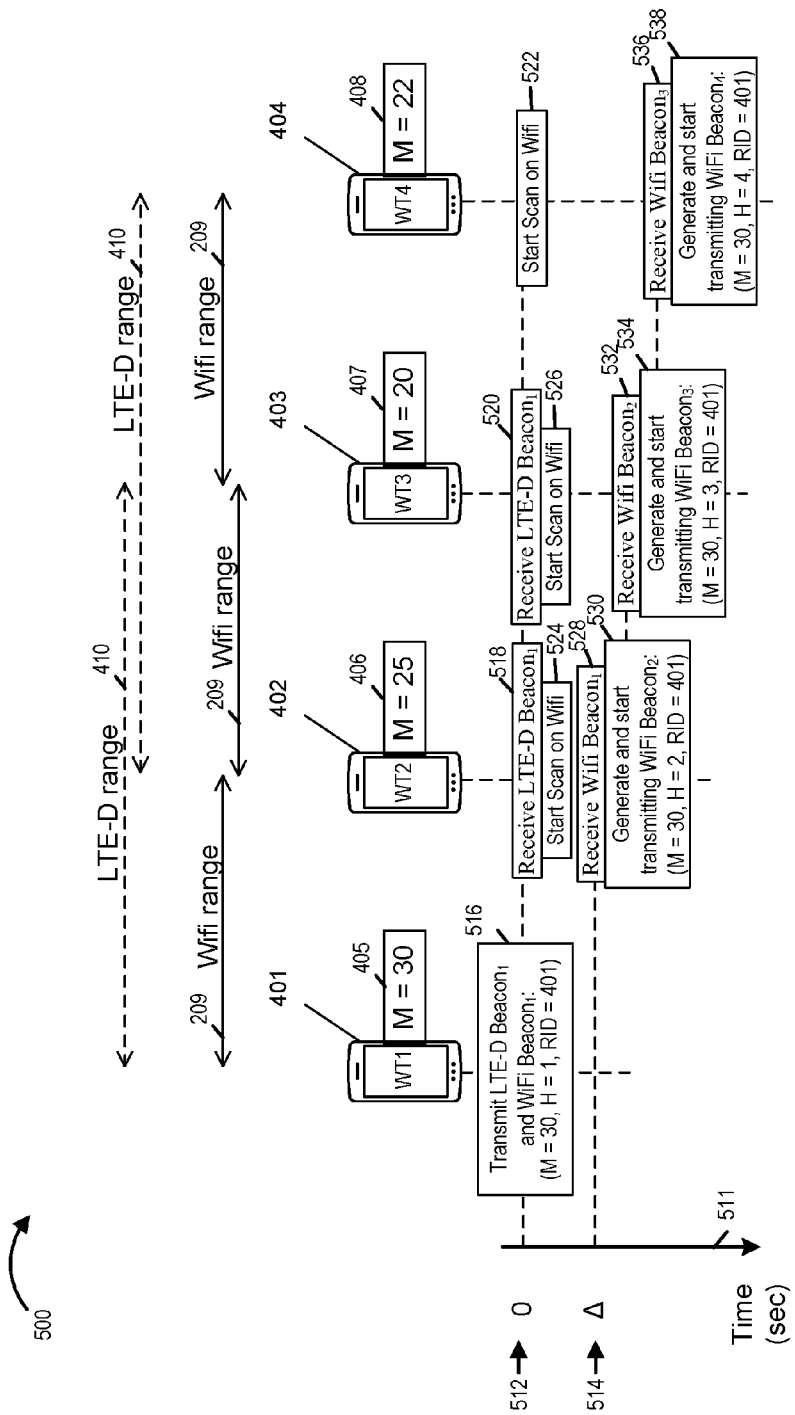
FIG. 5 illustrates a best case scenario corresponding to the speed at which a data path on WiFi interface can be established from device WT 4 to the top gateway WT 1 using LTE-D beacons in combination with WiFi beacons.
Figure 6:
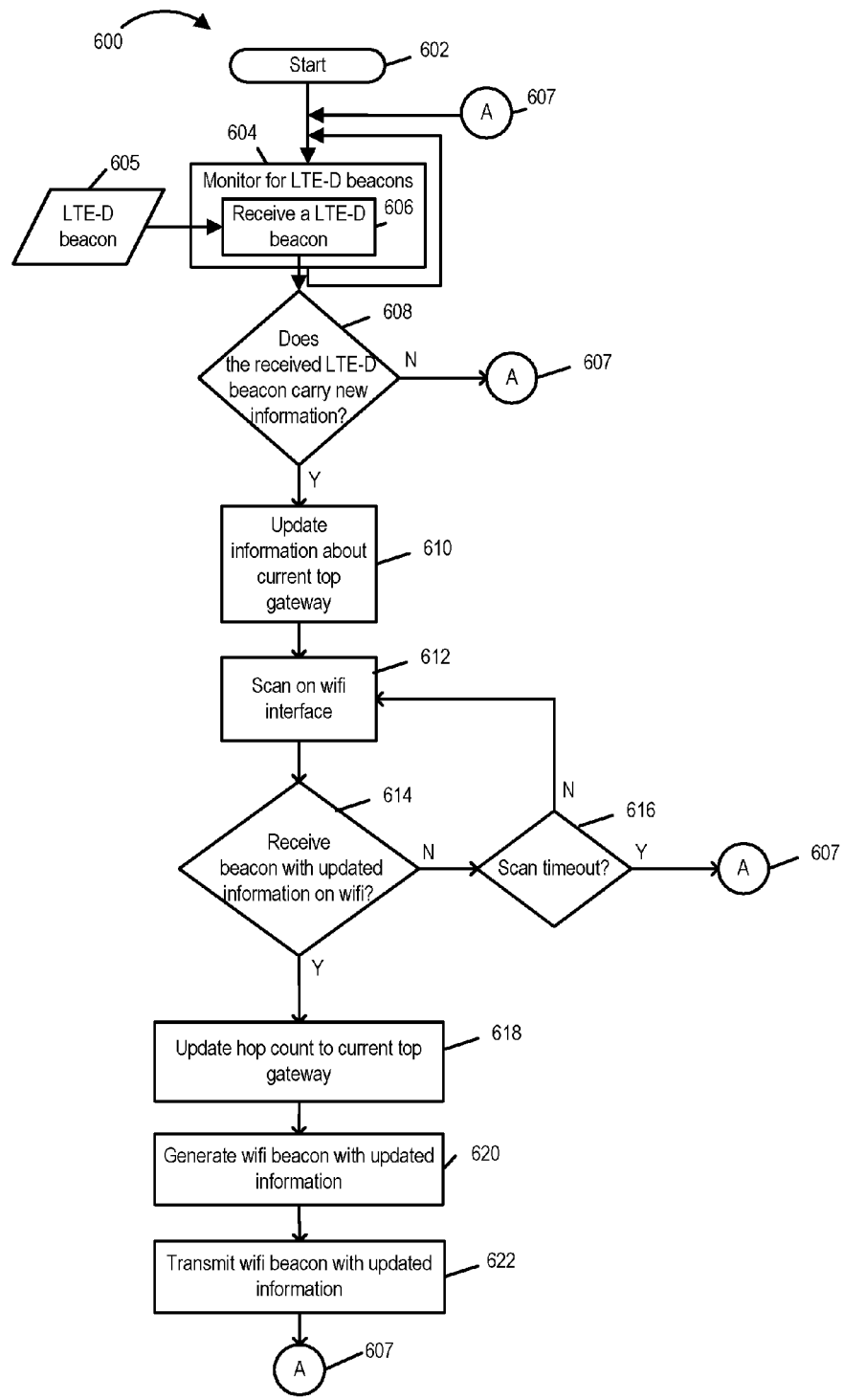
FIG. 6 is a flowchart of an exemplary method of operating a communications device in accordance with various embodiments of the present invention.

FIGS. 2-3 and FIGS. 4-5 can be used to compare the speed at which a data path on WiFi interface can be established from device WT 4 204 to the top gateway WT 1 201, using WiFi beacons only versus the speed at which a data path on WiFi interface can be established from device WT 4 404 to the top gateway WT 1 401 using a combination of WiFi and LTE-D beacons with a method in accordance with the some embodiments of the present invention, e.g., a method in accordance with flowchart 600 of FIG. 6.

In the examples of FIGS. 2-5 Δ denotes the duration between when a device starts scanning and when its neighbor's next WiFi beacon is received. In a distributed system where devices are not synchronized, Δ can be considered to be a uniform random variable between 0 and 100 ms, where 100 ms is WiFi beacon interval. Propagation and processing time has been excluded from FIGS. 2-5 for clarity. In practice, propagation and processing time are negligible compared to the other time periods.

FIGS. 2-5 illustrate best and worst case scenarios of WiFi beacons only versus WiFi+LTE-D beacons. In drawing 200 of FIG. 2 four exemplary communications devices (WT 1 201, WT 2 202, WT 3 203, WT 4 204) have signal quality metrics (M=30, M=25, M=20, M=22), respectively, as indicated by boxes (205, 206, 207, 208), respectively. Thus WT 1 201 has the highest signal quality metric and is the top gateway in the group of devices (201, 202, 203, 204). An exemplary WiFi range 209 is shown. In this example, WT 1 201 and WT 2 202 are in WiFi range of one another; WT 2 202 and WT 3 203 are in WiFi range of one another; and WT 3 203 and WT 4 204 are in WiFi range of one another.

Figure 2:
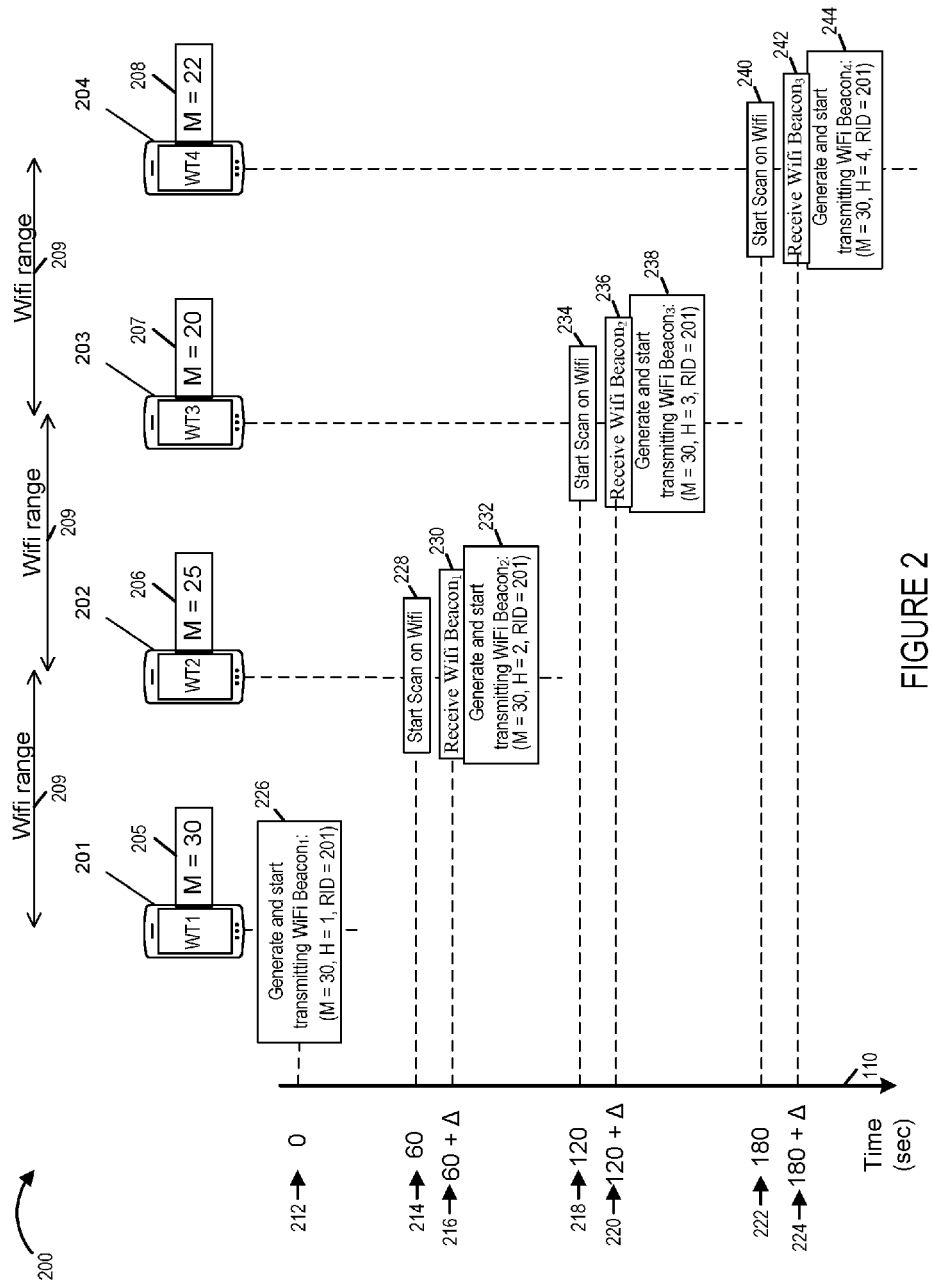
FIG. 2 illustrates a worst case scenario corresponding to the speed at which a data path on WiFi interface can be established from device WT 4 to the top gateway WT 1 using WiFi beacons.

FIG. 2 illustrates a worst case scenario corresponding to the speed at which a data path on WiFi interface can be established from device WT 4 204 to the top gateway WT 1 201 using WiFi beacons only. At time=0 sec 212, WT 1 201 generates and starts transmitting WiFi Beacon$_1$ communicating the following information tuple (M=30, H=1, RID=201), as indicated by block 226. WiFi Beacon$_1$ is transmitted by WT 1 201 every 100 msec.

At time=60 sec 214, WT 2 202 starts scanning on WiFi as indicated by block 228. At time 60+Δ sec 214, WT 2 202 receives WiFi Beacon$_1$ as indicated by block 230, and then, in response, WT 2 202 generates and starts transmitting WiFi Beacon$_2$ communicating the following information tuple (M=30, H=2, RID=201), as indicated by block 232. WiFi Beacon$_2$ is transmitted by WT 2 202 every 100 msec.

At time=120 sec 218, WT 3 203 starts scanning on WiFi as indicated by block 234. At time 120+Δ sec 220, WT 3 203 receives WiFi Beacon$_2$ as indicated by block 236, and then, in response, WT 3 203 generates and starts transmitting WiFi Beacon$_3$ communicating the following information tuple (M=30, H=3, RID=201), as indicated by block 238. WiFi Beacon$_3$ is transmitted by WT 3 203 every 100 msec.

At time=180 sec 222, WT 4 204 starts scanning on WiFi as indicated by block 240. At time 180+Δ sec 224, WT 4 204 receives WiFi Beacon$_3$ as indicated by block 242, and then, in response WT 4 204 generates and starts transmitting WiFi Beacon$_4$ communicating the following information tuple (M=30, H=4, RID=201), as indicated by block 244. WiFi Beacon$_4$ is transmitted by WT 4 204 every 100 msec.

In the example of FIG. 2, the time from the first WT 1 201 transmission of WiFi Beacon' and the reception by WT 4 204 of WiFi beacon$_3$ is a time interval of 180+Δ, and where Δ=50 msec (on average), the result is 180.05 sec.

Figure 3:
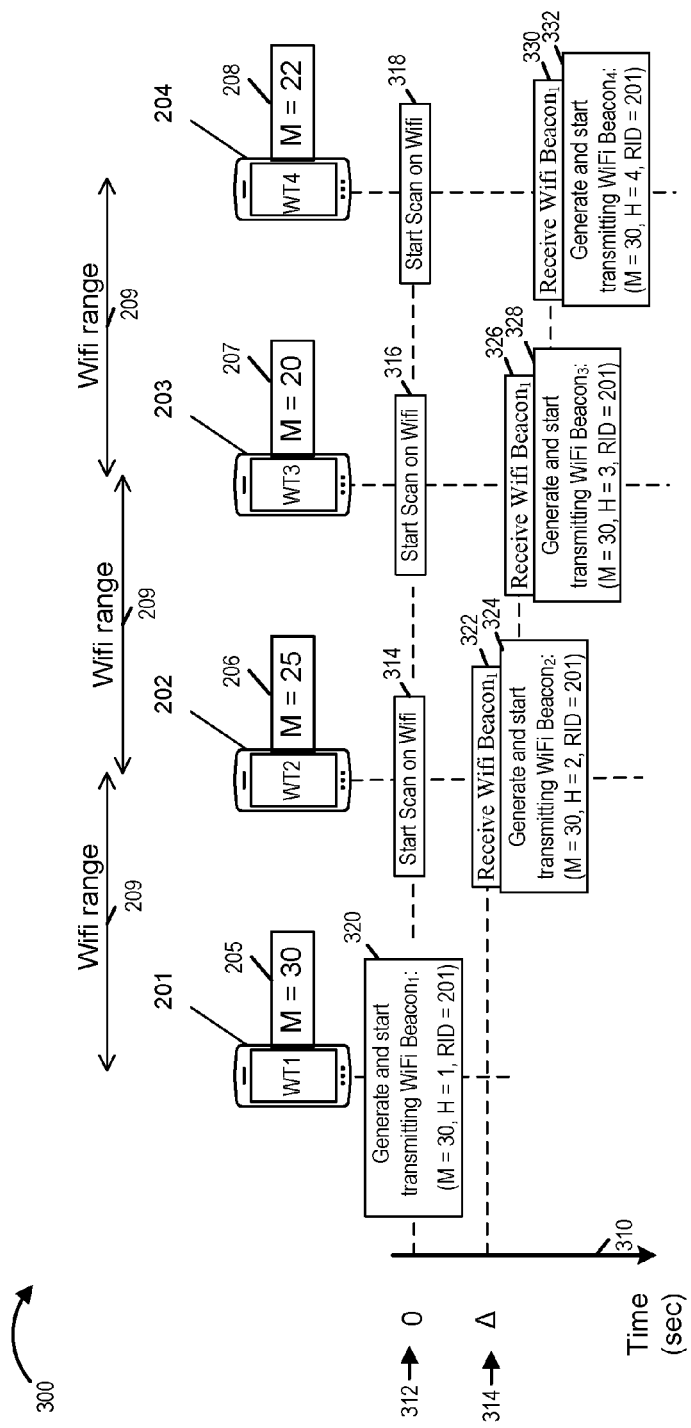
FIG. 3 illustrates a best case scenario corresponding to the speed at which a data path on WiFi interface can be established from device WT 4 to the top gateway WT 1 using WiFi beacons.

In drawing 300 of FIG. 3 the four exemplary communications devices (WT 1 201, WT 2 202, WT 3 203, WT 4 204) have signal quality metrics (M=30, M=25, M=20, M=22), respectively, as indicated by boxes (205, 206, 207, 208), respectively. Thus WT 1 201 has the highest signal quality metric and is the top gateway in the group of devices (201, 202, 203, 204). Exemplary WiFi range 209 is shown. In this example, WT 1 201 and WT 2 202 are in WiFi range of one another; WT 2 202 and WT 3 203 are in WiFi range of one another; and WT 3 203 and WT 4 204 are in WiFi range of one another.

FIG. 3 illustrates a best case scenario corresponding to the speed at which a data path on WiFi interface can be established from device WT 4 204 to the top gateway WT 1 201 using WiFi beacons only. At time=0 sec 312, WT 1 201 generates and starts transmitting WiFi Beacon$_1$ communicating the following information tuple (M=30, H=1, RID=201), as indicated by block 320. At time=0 312, WT 2 202, WT 3 203, WT 4 204, start scanning on WiFi as indicated by blocks (314, 316, 318), respectively.

At time=Δ sec 314, WT 2 202 receives WiFi Beacon$_1$ as indicated by block 322, and then in response WT 2 202 generates and starts transmitting WiFi Beacon$_2$ communicating the following information tuple (M=30, H=2, RID=201), as indicated by block 324.

WT 3 203 receives WiFi Beacon$_2$ as indicated by block 326, and then in response WT 3 203 generates and starts transmitting WiFi Beacon$_3$ communicating the following information tuple (M=30, H=3, RID=201), as indicated by block 328.

WT 4 204 receives WiFi Beacon$_3$ as indicated by block 330, and then in response WT 4 204 generates and starts transmitting WiFi Beacon$_4$ communicating the following information tuple (M=30, H=4, RID=201), as indicated by block 332.

In the example of FIG. 3, the time from the first WT1 201 transmission of WiFi Beacon$_1$ and the reception by WT 4 204 of WiFi beacon$_3$ is a time interval of Δ sec, and where Δ=50 msec (on average), the result is 0.05 sec.

In drawing 400 of FIG. 4 four exemplary communications devices (WT 1 401, WT 2 402, WT 3 403, WT 4 404) have signal quality metrics (M=30, M=25, M=20, M=22), respectively, as indicated by boxes (405, 406, 407, 408), respectively. Thus WT 1 401 has the highest signal quality metric and is the top gateway in the group of devices (401, 402, 403, 404). An exemplary WiFi range 209 is shown. In this example, WT 1 401 and WT 2 402 are in WiFi range of one another; WT 2 402 and WT 3 403 are in WiFi range of one another; and WT 3 403 and WT 4 404 are in WiFi range of one another. An exemplary LTE-D range 410 is shown. In this example, WT 2 402 and WT 3 403 are in LTE-D range of WT 1 401; WT 3 403 and WT 4 404 are in LTE-D range of WT 2 402.

FIG. 4 illustrates a worst case scenario corresponding to the speed at which a data path on WiFi interface can be established from device WT 4 404 to the top gateway WT 1 401 using LTE-D beacons in combination with WiFi beacons. At time=0 sec 412, WT 1 401 generates and starts transmitting WiFi Beacon$_1$ communicating the following information tuple (M=30, H=1, RID=401), as indicated by block 422. WiFi Beacon$_1$ is transmitted by WT 1 201 every 100 msec.

At time=10 s 414, WT 1 401 generates and starts transmitting LTE Beacon$_1$ communicating the following information tuple (M=30, H=1, RID=401), as indicated by block 424. Note that the LTE-D beacon1 is transmitted once every 10 seconds and is synchronized to timing reference, but the WiFi beacon1 is transmitted every 100 msec.

WT 2 402 and WT 3 403, which are within LTE-D range of WT 1 401, receive LTE-D beacon1 as indicated by blocks (426, 428), respectively. In response to the received LTE-D beacon1, WT 2 402 and WT 3 403 start scanning on WiFi as indicated by blocks (428, 432), respectively.

At time=10+Δ sec 416, WT 2 402 receive WiFi Beacon$_1$ as indicated by block 434, and then in response WT 2 402 generates and starts transmitting WiFi Beacon$_2$ communicating the following information tuple (M=30, H=2, RID=401), as indicated by block 436. WT 3 403 receives WiFi Beacon$_2$ as indicated by block 438, and then in response WT 3 403 generates and starts transmitting WiFi Beacon$_3$ communicating the following information tuple (M=30, H=3, RID=401), as indicated by block 440.

At time=20 sec 418, WT 1 401 again transmits LTE Beacon$_1$ communicating the following information tuple (M=30, H=1, RID=401), as indicated by block 442. At time=20 s 414, WT 2 402 generates and starts transmitting LTE Beacon$_2$ communicating the following information tuple (M=30, H=2, RID=401), as indicated by block 444. Note that LTE Beacon$_2$ is transmitted at 10 sec intervals and is synchronized to a timing reference. At time=20 sec 414, WT 3 403 generates and starts transmitting LTE-D Beacon$_3$ communicating the following information tuple (M=30, H=3, RID=401), as indicated by block 446.

WT 4 404 receives LTE-D Beacon$_2$ and/or LTE-D Beacon$_3$, as indicated in block 448, and in response to the received LTE-D beacon or beacons, WT 4 404 starts scanning on WiFi, as indicated in step 452. WT 3 403 previously started transmitting WiFi Beacon$_3$, as indicated in step 440 and is still transmitting, at 100 msec intervals, WiFi Beacon$_2$, as indicated in step 446.

At time=20+Δ sec 420, WT 4 404 receives WiFi Beacon$_3$ as indicated by block 452, and then in response WT 4 404 generates and starts transmitting WiFi Beacon$_4$ communicating the following information tuple (M=30, H=4, RID=401), as indicated by block 454.

In the example of FIG. 4, the time from WT 1 401 transmission of first WiFi Beacon$_1$ and the reception by WT 4 404 of WiFi beacon$_3$ is a time interval of 20+Δ sec, and where Δ=50 msec (on average), the result is 20.05 sec.

In drawing 500 of FIG. 5 the four exemplary communications devices (WT 1 401, WT 2 402, WT 3 403, WT 4 404) have signal quality metrics (M=30, M=25, M=20, M=22), respectively, as indicated by boxes (405, 406, 407, 408), respectively. Thus WT 1 401 has the highest signal quality metric and is the top gateway in the group of devices (401, 402, 403, 404). Exemplary WiFi range 209 is shown. In this example, WT 1 401 and WT 2 402 are in WiFi range of one another; WT 2 402 and WT 3 403 are in WiFi range of one another; and WT 3 403 and WT 4 404 are in WiFi range of one another. Exemplary LTE-D range 410 is shown. In this example, WT 2 402 and WT 3 403 are in LTE-D range of WT 1 401; WT 3 403 and WT 4 404 are in LTE-D range of WT 2 402.

Drawing 500 of FIG. 5 illustrates a best case scenario corresponding to the speed at which a data path on WiFi interface can be established from device WT 4 404 to the top gateway WT 1 401 using LTE-D beacons in combination with WiFi beacons. At time=0 sec 512, WT 1 401 generates and starts transmitting beacons including a LTE-D beacon1 and WiFi Beacon$_1$ communicating the following information tuple (M=30, H=1, RID=401), as indicated by block 516. Note that LTE-D beacon1 will be transmitted once every 10 seconds and is synchronized with respect to a timing reference, and the WiFi beacon will be transmitted at 10 msec intervals.

WT 2 402 and WT 3 403, which are within LTE-D range of WT 1 401, receive LTE-D beacon$_1$ as indicated by blocks (518, 520), respectively. In response to the received LTE-D beacon$_1$, WT 2 402 and WT 3 403 start scanning on WiFi as indicated by blocks (524, 526), respectively. WT 4 404 also starts scanning on WiFi, as indicated by block 522. The WT 4 404 scanning start is not triggered by a received LTE-D beacon; however, WT 4's scan start timing fortuitously happens to occur at this time, e.g., without being forced to start scanning from an external event.

At time=Δ sec, WT 2 402 receives WiFi Beacon$_1$, as indicated by block 528, and in response WT 2 402 generates and starts transmitting WiFi Beacon$_2$ communicating the following information tuple (M=30, H=2, RID=401), as indicated by block 530. WT 3 403 receives WiFi Beacon$_2$ as indicated by block 532, and then in response WT 3 403 generates and starts transmitting WiFi Beacon$_3$ communicating the following information tuple (M=30, H=3, RID=401), as indicated by block 534. WT 4 404 receives WiFi Beacon$_3$ as indicated by block 536, and then, in response, WT 4 404 generates and starts transmitting WiFi Beacon$_4$ communicating the following information tuple (M=30, H=4, RID=401), as indicated by block 538.

In the example of FIG. 5, the time from WT1 401 first transmission of WiFi Beacon$_1$ and the reception by WT 4 404 of WiFi beacon$_3$ is a time interval of Δ sec, and where Δ=50 msec (on average), the result is 0.05 sec.

The results corresponding to FIGS. 2-5 are summarized in the Table below, using the average value for Δ (50 ms).

|  | WiFi only | WiFi + LTE-D |
|---|---|---|
| Best case | 0.05 s | 0.05 s |
| Worst case | 180.05 s | 20.05 s |

In some other embodiments, a device starts to beacon out an LTE-D beacon as soon as the device receives an LTE-D beacon (instead of waiting until the next beaconing opportunity). In some other embodiments, a device starts to beacon out a WiFi beacon as soon as the device receives an LTE-D beacon (instead of waiting until the device receives a WiFi beacon.

FIG. 6 is a flowchart 600 of an exemplary method of operating a communications device in accordance with various embodiments of the present invention. The method of flowchart 600 is performed by a communications device receiving an LTE-D beacon, e.g., WT 402 or WT 403 or WT 404 of FIG. 4 or 5.

Operation starts in step 602 in which the communications device implementing the flowchart of FIG. 6 is powered on and initialized. Operation proceeds from step 602 to step 604. In step 604 the communications device monitors for LTE-D beacons, e.g., during predetermined time intervals in accordance with a schedule which is synchronized to a timing reference signal. Step 604 may, and sometimes does include step 606 in which the communications device receives an LTE-D beacon 605.

In response to the received LTE-D beacon 605, operation proceeds from step 606 to step 608. In step 608 the communications device determines whether or not the received LTE-D beacon 605 carries any new information. If the determination is that the received LTE-D beacon does not carry new information, then operation proceeds from step 608, via connecting node A 607 to step 604 for additional monitoring.

However, if the communications device determines that the received LTE-D beacon carries new information then operation proceeds from step 608 to step 610, in which the communications device updates information about the top gateway. Operation proceeds from step 610 to step 612.

In step 612 the communications device scans on WiFi interface. Operation proceeds from step 612 to step 614. In step 614 the communications device checks as to whether or not the communications device has received a WiFi beacon with updated information. If the determination of step 614 is that the communications device has not received a beacon with updated information on the WiFi, then operation proceeds from step 614 to step 616. In step 616, the communications device checks as to whether or not the scan timeout has been reached. If the WiFi scan timeout has been reached, then operation proceeds from step 616, via connecting node A 607 to step 604 for additional monitoring for LTE-D beacons. However, if the determination of step 616 is that the WiFi scan time timeout has not been reached then operation proceeds from step 616 to step 612 for additional scanning on the WiFi interface.

Returning to step 614, in step 614 if the determination is that a WiFi beacon has been received with new information, then operation proceeds from step 614 to step 618. In step 618, the communications device updates hop count to current top gateway. Operation proceeds from step 618 to step 620, in step 620 the communications device generates a WiFi beacon with updated information. Operation proceeds from step 620 to step 622 in which the communications device transmits the generated WiFi beacon with updated information. Operation proceeds from step 622, via connecting node A 607 to step 604 for additional monitoring for LTE-D beacons.

Various methods and apparatus in accordance with some embodiments of the present invention are directed to preemptive route selection. One big challenge in current hybrid infrastructure (with WiFi for peer-to-peer connections, and cellular for last hop) is providing seamless handover in the present of device mobility. As the devices move, their current connection may deteriorate below a useable threshold. This can happen when either the served device (called the node hereafter) or the serving device (called the relay hereafter) moves with respect to the other. Ideally, it is desirable for the node to have a fallback connection that it can quickly switch to, so that the quality of communication is not affected. However, this is currently not achievable in many cases.

Devices discover each other through beacons. Since the range of WiFi beacons is similar to the range of WiFi data connections, when a new connection becomes available (e.g. because the node moves inside the WiFi data connection range of a new potential relay), the node cannot make use of the new connection right away. It needs to wait for the discovery and route conversion processes to finish. The discovery process can incur significant delay because WiFi is asynchronous and the node can have a long interval between WiFi scans. This delay degrades the quality of communication.

LTE-D beacons operate on licensed spectrum, and thus have a much longer range than WiFi beacons. Various embodiments in accordance with the present invention utilizes this longer range, e.g., of LTE-D beacons, to allow devices to "look ahead".

In some embodiments, upon receiving a beacon, the device, which received the beacon, compares the received power of the new beacon with previously received beacons from the same source. Using the time series of received beacon power, the receiving device can estimate its relative motion with the beacon source. In various embodiments, the receiving device has a higher preference for sources to which its relative motion is one of moving closer. The receiving device includes this preference in its list of parameters used to rank quality of routes. In some embodiments its list of parameters used to rank quality of routes include source cellular signal quality, load, battery level, mobility, etc.

Figure 7:
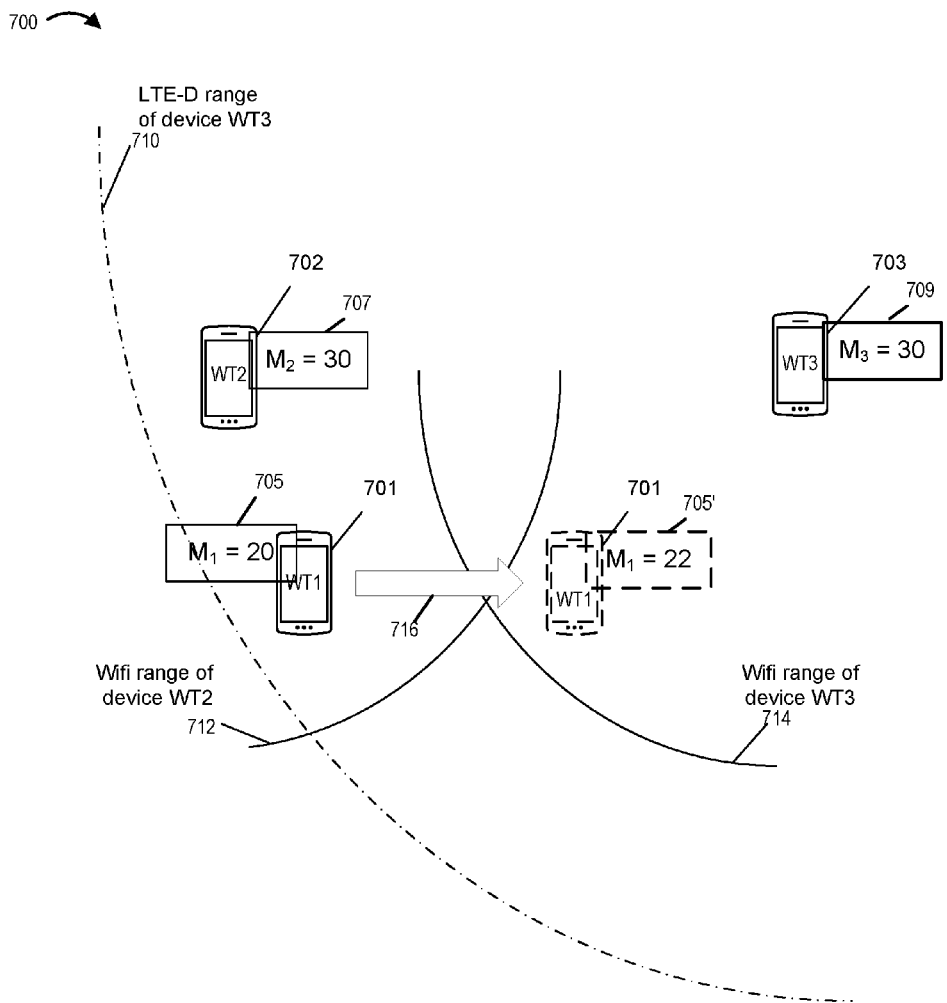
FIG. 7 illustrates a sample scenario of preemptive route selection in accordance with an exemplary embodiment.

Drawing 700 of FIG. 7, illustrates a sample scenario of preemptive route selection in accordance with an exemplary embodiment. Three exemplary communications devices (WT 1 701, WT 2 702 WT 3 703) are shown, each device (WT 1 701, WT 2 702 WT 3 703) including LTE and WiFi interfaces. WT 1 701 has signal quality metric $M_1=20$, as indicated in box 705, and is currently connected to WT 2 702 which is serving as a gateway, and which has signal quality metric $M_2=30$, as indicated in box 707. The boundary of the maximum LTE range for WT 3 703 is indicated by dot-dash line 710; and the boundary for the maximum WiFi range for WT 3 703 is indicated by solid line 714. The boundary for the maximum WiFi range for WT 2 702 is indicated by solid line 712. Consider that WT 1 701 is initially within both LTE-D range and WiFi range, of WT 2 702 ($M_2=30$). Further consider that WT 1 701 is initially within LTE-D range, but not within WiFi range, of WT 3 703 ($M_3=30$). Consider that WT 1 701 is moving as indicated by arrow 716. WT 1 701 receives LTE-D beacons from WT 3 703; WT 1 701 learns that it is moving towards WT 3 703. From received WiFi beacons of WT 2 702 WT 1 701 learns that it is moving away from WT 2 702. These conditions make the route quality metric of WT 2 702 degrade below ROUTE_BREAK_THRESHOLD, and route quality metric of WT 3 703 become the highest. Device WT 1 701 starts to actively scan on WiFi. As soon as device WT 1 701 receives WT 3 703's WiFi beacon, WT 1 701 can start a connection procedure with device WT 3 703. Device WT 1 701 has a new signal quality metric value, $M_1=22$, as indicated in box 705', at the new location shown in FIG. 7.

Figure 8:
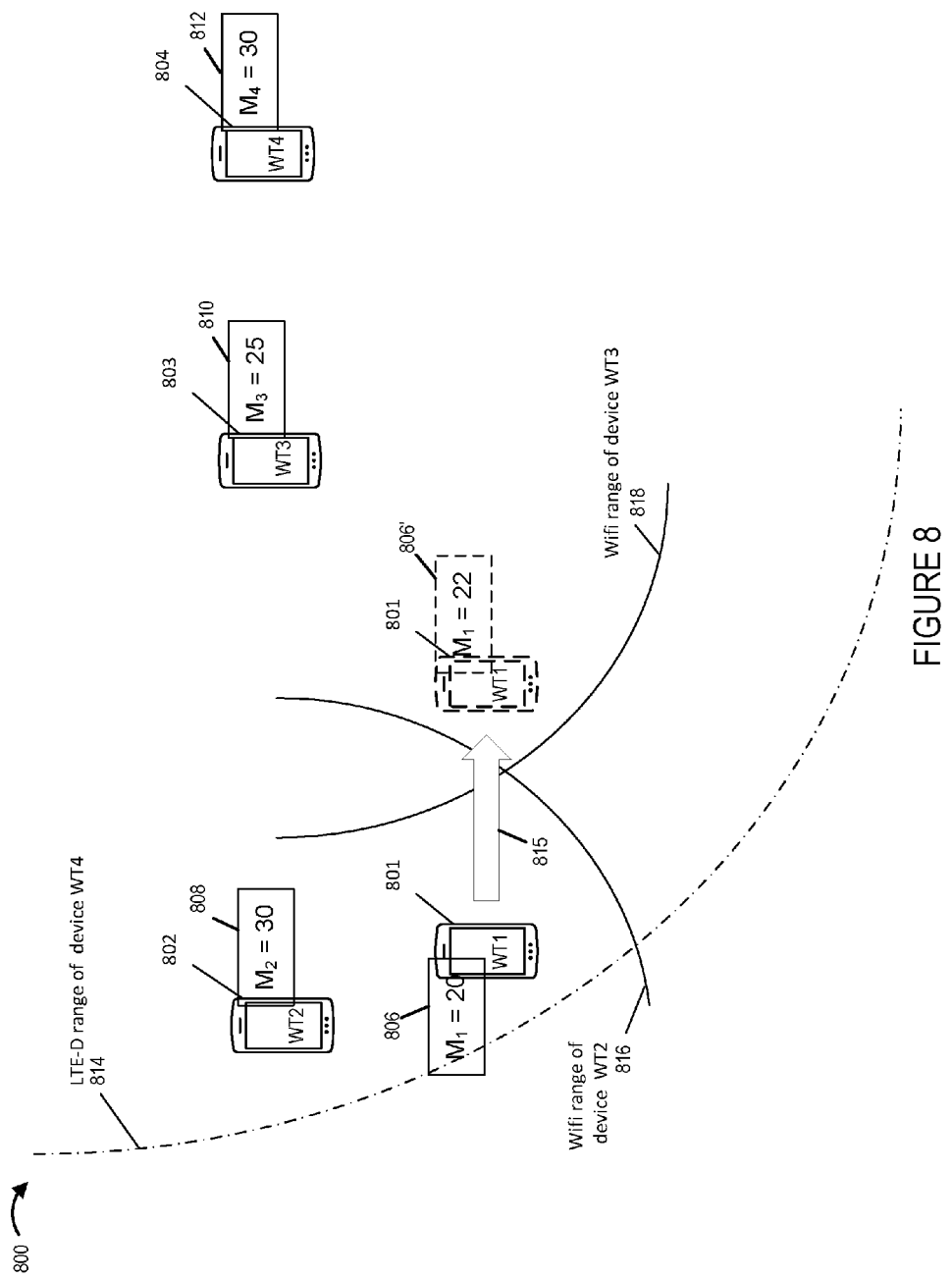
FIG. 8 illustrates another sample scenario of preemptive route selection in accordance with an exemplary embodiment.

Drawing 800 of FIG. 8 illustrates another sample scenario of preemptive route selection in accordance with an exemplary embodiment. Consider that exemplary devices (WT 1 801, WT 2 802, WT 3 803, WT 4 804) each include WiFi and LTE interfaces. Devices (801, 802, 803, 804) have signal quality metrics ($M_1=20$, $M_2=30$, $M_3=25$, $M_4=30$), respectively.

Consider that device WT 1 801 is moving as indicated by arrow 815. The boundary of the maximum LTE range for device WT 4 804 is indicated by dot-dash line 814; and the boundary for the maximum WiFi range for device WT 3 803 is indicated by solid line 818. The boundary for the maximum WiFi range for device WT 2 802 is indicated by solid line 816.

In this case, device WT 1 801 determines from received LTE-D beacons from device WT 4 804 and received WiFi beacons from device WT 2 402 that device WT 1 801 is moving away from its current gateway WT 2 802 towards device WT 4 804. Device WT 4 804 becomes the top gateway in device WT 1 801's route list, while the quality of route metric for the current route to device WT 2 802 degrades below ROUTE_BREAK_THRESHOLD. Device WT 1 801 starts scanning on WiFi. As device WT 1 801 moves into WiFi range of device WT 3 803, device WT 1 801 detects from device WT 3 803's WiFi beacon that device WT 3 803 is part of the route to top gateway WT 4 804. Device WT 1 801 initiates a connection procedure to device WT 3 803. Device WT 1 801 has a new signal quality metric value, $M_1=22$, as indicated in box 806', at the new location shown in FIG. 8.

Figure 9:
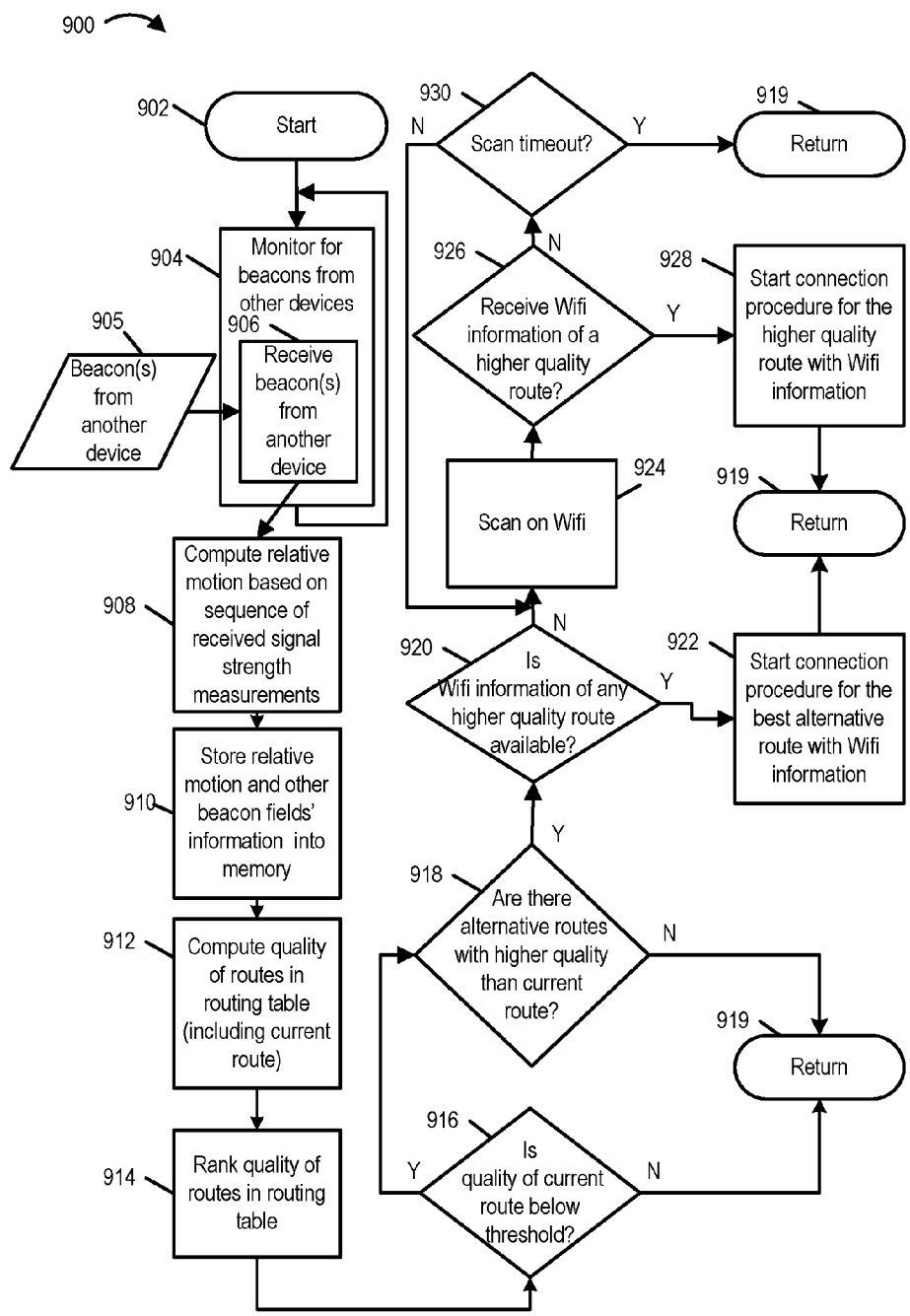
FIG. 9 is a flowchart of an exemplary method of operating a communications device in accordance with an exemplary embodiment.

FIG. 9 is a flowchart 900 of an exemplary method of operating a communications device in accordance with an exemplary embodiment. Flowchart 900 describes preemptive route selection in accordance with an exemplary embodiment. The method of FIG. 9 may be performed by a communications device, e.g., WT 1 701 of FIG. 7 or WT 1 801 of FIG. 8, including interfaces for receiving LTE-D beacons and WiFi beacons.

Operation starts in step 902 in which the communications device is powered on and establishes a route to a gateway device, e.g., based on one or more received beacons. In step 902 the communications device also generates a routing table. Operation proceeds from step 902 to step 904.

In step 904 the communications device monitors for beacons from other devices. The monitoring of step 904 for beacons is performed on an ongoing basis, e.g., during beacon monitoring intervals. Some of the beacon monitoring intervals may be synchronized with respect to a timing reference, e.g., beacon intervals in which LTE-D beacons can be communicated. Other monitoring intervals may or may not be synchronized with respect to the external timing reference, e.g., monitoring intervals for detecting WiFi beacons. Step 904 may, and sometimes does include step 906 in which the communications device receives one or more beacon(s) 905 from another device.

Operation proceeds from step 906 to step 908 in response to a received beacon. In step 908 the communications device computes relative motion of the communications device with respect to the device which transmitted the received beacon based on a sequence of received signal strengths including the received signal strength of the received beacon. Operation proceeds from step 908 to step 910.

In step 910 the communications device store relative motion information and information from other beacon fields in the received beacon in memory in the communications device. Operation proceeds from step 910 to step 912. In step 912 the communications device computes the quality of routes in the routing table including the current route. Operation proceeds from step 912 to step 914 in which the communications device ranks the quality of routes in the routes the table. Operation proceeds from step 914 to step 916.

In step 916 the communications device determines if the quality of the current route is below a threshold, e.g., a route break threshold. If the determination is that that the quality of the current route is not below the threshold, then operation proceeds to return step 919. However, if the determination of step 916 is that the quality of the current route is below the threshold, then operation proceeds from step 916 to step 918. In step 918, the communications device determines whether or not there are any alternative routes with higher quality than the current route. If the communications device determines that there is at least one alternative route with higher quality than the current route, then operation proceeds from step 918 to step 920.

In step 920, the communications device determines whether or not there is WiFi information of any higher quality route available. If the determination of step 920 is that there is WiFi information available on a higher quality route available, then operation proceeds from step 920 to step 922. In step 922 the communications device starts a connection procedure for the best available route for which WiFi information is available.

However, if the determination of step 920 is that WiFi information of a higher quality route is not available, then operation proceeds from step 920 to step 924. In step 924 the communications device scan on the WiFi interface. Operation proceeds from step 920 to step 924. In step 924 the communications device checks to see if the communications device has received WiFi information on a higher quality route. If the communications device has not received WiFi information on a higher quality route, then operation proceeds from step 926 to step 930. In step 930 the communications device checks to determine if the scan has timed out. If the scan timeout has been reached then operation proceeds to return step 919. However if the scan timeout has not been reached, then operation proceeds from step 930 to step 924 for more WiFi scanning.

Returning to step 926, if the communications device has received WiFi information on a higher quality route, then operation proceeds from step 926 to step 928. In step 928 the communications device starts a connection procedure for the higher quality route using the WiFi information. Operation proceeds from step 928 to return step 919.

Figure 10A:
FIG. 10A is a first part of a flowchart of an exemplary method of operating a first communications device in accordance with various exemplary embodiments.
Figure 10B:
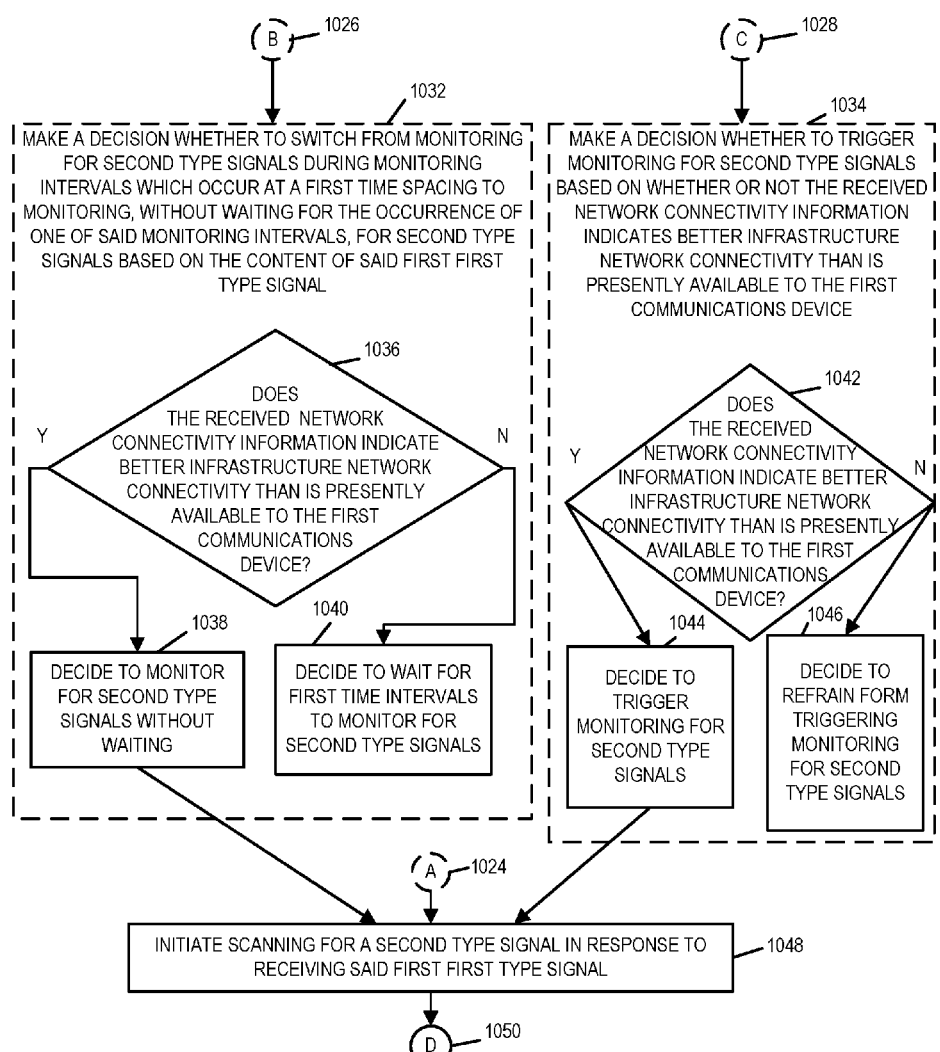
FIG. 10B is a second part of a flowchart of an exemplary method of operating a first communications device in accordance with various exemplary embodiments.
Figure 10C:
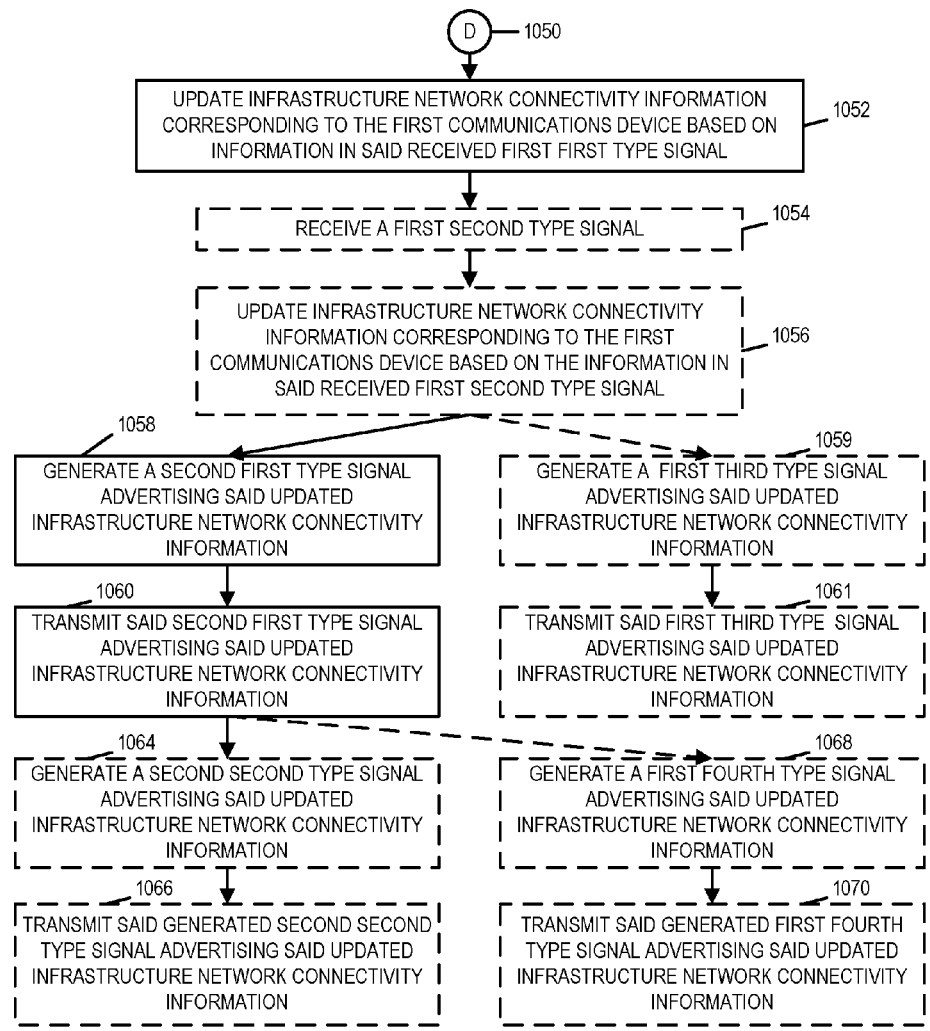
FIG. 10C is a third part of a flowchart of an exemplary method of operating a first communications device in accordance with various exemplary embodiments.

FIG. 10, comprising the combination of FIG. 10A, FIG. 10B and FIG. 10C, is a flowchart 1000 of an exemplary method of operating a first communications device in accordance with various exemplary embodiments. The first communications device is, e.g., communications device 1300 of FIG. 13. The first communications device implementing the method of flowchart 10 is, e.g., a communications device with device to device capability which can receive LTE-D beacons and WiFi beacons. Operation starts in step 1002 and proceeds to step 1004.

In step 1004 the first communications device receives a first first type signal transmitted by an advertising device, said first first type signal advertising infrastructure, e.g., celluar, network connectivity information corresponding to the advertising device. In some embodiments, the first type signal is a broadcast or multicast signal. In some embodiments, the first type signal is a wireless broadcast signal communicating a beacon signal, e.g., a beacon frame. In some embodiments, the first first type broadcast signal is a LTE-D beacon. In some embodiments, the advertising device is a gateway device or an intermediate device.

Step 1004 includes step 1006 in which the first communications device receives infrastructure network connectivity information corresponding to the advertising device. In some embodiments, said infrastructure network connectivity information includes quality information about a communication path used by said advertising device to connect to the infrastructure network. In some such embodiments, said quality information includes information about a connection between a gateway device used by the advertising device and the infrastructure network. In some such embodiments, said infrastructure network connectivity information includes one or more of the following: information indicating a number of peer to peer hops between the advertising device and the gateway device; information on quality of said peer to peer hops between the advertising device and the gateway device; information indicating a mobility level of the advertising device; information identifying the infrastructure network, e.g. identifying the operator of the network; or information indicating a type, e.g. number of antennas coupled to the gateway device, UE category, etc., of the gateway device.

In some embodiments, said connection may be, and sometimes is, a single hop connection to the infrastructure network. In some such embodiments, said advertising device and said gateway are the same device, and said path is a single hop connection to the infrastructure network.

Step 1006 includes step 1008 and 1010. In some embodiments, step 1006 further includes one or more or all of steps 1012, 1014, and 1016. In step 1008 the first communications device receives quality information about a communications path used by said advertising device to connect to the infrastructure network. Step 1008 includes step 1018 and may include optional step 1020. In step 1018 the first communications device receives quality information about a connection between a gateway device used by the advertising device to connect to the infrastructure network. In step 1020 the first communications device receives information on the quality of said peer to peer hops between the advertising device and the gateway device.

In step 1010 the first communications device receives information indicating a number of hops between the advertising device and an infrastructure network node. In some embodiments, step 1010 includes step 1022 in which the first communications device receives information indicating a number of peer to peer hops between the advertising device and the gateway device. In some embodiments, the same received information is used to communicate both (i) the number of hops between the advertising device and an infrastructure network node and (ii) the number of peer to peer hops between the advertising device and the gateway device. For example, a value communicating the number of hops between the advertising device and an infrastructure network node is communicated in a field of the first first type signal, and the number of peer to peer hops between the advertising device and the gateway device is 1 less than that communicated value. Alternatively, a value communicating the number of peer to peer hops between the advertising device and the gateway device is communicated in a field of the first first type signal, and the number of hops between the advertising device and an infrastructure network node is 1 more than that communicated value.

In step 1012 the first communications device receives information indicating a mobility level of the advertising device. In step 1014, the first communications device receives information identifying the infrastructure network. In some embodiments, the information identifying the infrastructure network identifies the operator of the network. In step 1016 the first communications device receives information indicating a type of the gateway device. In some embodiments, the information indicating a type of the gateway device indicates a number of antennas coupled to the gateway device. In some embodiments, the information indicating a type of the gateway device indicates a user equipment (UE) category.

Operation proceeds from step 1004 via one of three alternative paths, e.g., depending upon the particular embodiment, to step 1048 via connecting node A 1024, to step 1032 via connecting node B 1026, or to step 1034 via connecting node C 1028.

In a first embodiment, operation proceeds from step 1004 via connecting node A 1024 to step 1048 in which the first communications device initiates scanning for a second type signal, in response to receiving said first first type signal. In some embodiments, the second type signal is a broadcast signal, e.g., a WiFi broadcast signal.

In a second embodiment, operation proceeds from step 1004 via connecting node B 1026 to step 1032, in which the first communications device makes a decision whether to switch from monitoring for second type signals during monitoring intervals which occur at a first time spacing to monitoring, without waiting for the occurrence of one of said monitoring intervals, e.g., start monitoring immediately, for second type broadcast signals, based on the content of said first first type signal. Step 1032 includes steps 1036, 1038 and 1040. In step 1036 the first communications checks determines if the received network connectivity information received in the first first type signal indicates better infrastructure network connectivity than is presently available to the first communications device. If the determination is that the received network connectivity information does indicate better infrastructure network connectivity than is presently available to the first communications device, then operation proceeds from step 1036 to step 1038 in which the first communications device decides to monitor for second type signals without waiting. However, if the determination is that the received network connectivity information does not indicate better infrastructure network connectivity than is presently available to the first communications device, then operation proceeds from step 1036 to step 1040 in which the first communications device decides to wait for first time intervals to monitor for second type signals.

Operation proceeds from step 1036 to step 1048 in which the first communications device initiates scanning for a second type signal, e.g., a WiFi broadcast signal, in response to receiving said first first type signal.

In a third embodiment, operation proceeds from step 1004 via connecting node C 1028 to step 1034, in which the first communications device makes a decision whether to trigger monitoring for second type signals based on whether or not the received network connectivity information in the received first first type signal indicates better infrastructure network connectivity information than is presently available to the first communications device. In some such embodiments, the first and second type signals are beacon signals. Step 1034 includes steps 1042, 1044 and 1046. In step 1042 the first communications checks determines if the received network connectivity information received in the first first type signal indicates better infrastructure network connectivity than is presently available to the first communications device. If the determination is that the received network connectivity information does indicate better infrastructure network connectivity than is presently available to the first communications device, then operation proceeds from step 1042 to step 1044 in which the first communications device decides to trigger monitoring for second type signals. However, if the determination is that the received network connectivity information does not indicate better infrastructure network connectivity than is presently available to the first communications device, then operation proceeds from step 1042 to step 1046 in which the first communications device decides to refrain from triggering monitoring for second type signals.

Operation proceeds from step 1044 to step 1048 in which the first communications device initiates scanning for a second type signal, e.g., a WiFi broadcast signal, in response to receiving said first first type broadcast signal.

In various embodiments, a first type signal has a longer transmission range than a second type signal. In some such embodiments, the first type signal is a wireless broadcast signal that corresponds to a first communications protocol, e.g., an LTED protocol, and the second type signal is a second wireless broadcast signal that corresponds to a second communications protocol, e.g., a WiFi protocol. In some such embodiments, a first type signal is synchronized to a time reference, e.g., one of a global or cellular time reference or a time reference that uses distributed time synchronization algorithms within a group of devices, and a second type signal is unsynchronized or synchronized to a lesser degree than a first type signal, e.g., second type signals may have jitter or occur at less predictable time relative to the timing reference, e.g., global timing reference, being used by first type signals.

Operation proceeds from step 1048, via connecting node D 1050, to step 1052. In step 1052 the first communications device updates infrastructure network connectivity information corresponding to the first communications device based on information in said received first first type signal. Operation proceeds from step 1052 to step 1054 or step 1058, depending upon whether or not a second type signal was detected during the initiated scanning for second type signals. In step 1054 the first communications device receives a first second type signal. In some embodiments, the first second type signal is a signal communicating a WiFi beacon frame or a WiFi action frame.

Operation proceeds from step 1054 to step 1056 in which the first communications device updates infrastructure network connectivity information corresponding to the first communications device based on the information in said received first second type signal. Operation proceeds from step 1056 to step 1058. In some embodiments, operation also proceeds from step 1056 to step 1059.

In step 1058 the first communications device generates a second first type signal advertising said updated infrastructure network connectivity information corresponding to the first communications device. Operation proceeds from step 1058 to step 1060 in which the first communications device transmits said generated second first type signal, e.g., an LTE-D beacon, advertising said updated infrastructure network connectivity information corresponding to the first communications device. In one scenario the first communications device has not received a first second type signal in step 1054 and updated network connectivity information included in the second first type signal is based on information from the received first first type signal. In another scenario the first communications device has received a first second type signal in step 1054 and updated network connectivity information included in the second first type signal is based on information from the received first first type signal and the received first second type signal.

In step 1059 the first communications device generates a first third type signal advertising said updated infrastructure network connectivity information corresponding to the first communications device. Operation proceeds from step 1059 to step 1061 in which the first communications device transmits said generated first third type signal advertising said updated infrastructure network connectivity information corresponding to the first communications device. In some embodiments, the first third type signal is a different type of long range broadcast signal, e.g., beacon, than the second first type signal, e.g., using a different communications protocol and a different communications interface.

If a first second type signal was received in step 1054, then operation proceeds from step 1060 to step 1064, in which the first communications device generates a second second type signal advertising said updated infrastructure network connectivity information corresponding to the first communications device. Operation proceeds from step 1064 to step 1066 in which the first communications device transmits the generated second second type signal advertising said updated network connectivity information corresponding to the first communications device. In some embodiments, the second second type signal is a WiFi signal communicating a WiFi beacon frame or a WiFi action frame.

In some embodiments, operation also proceeds from step 1060 to step 1068 in which the first communications device generates a first fourth type signal advertising said updated network interconnectivity information corresponding to said first communications device. Operation proceeds from step 1068 to step 1070 in which the first communications device transmits the generated first fourth type signal advertising said updated network connectivity information corresponding to the first communications device. In some embodiments, the first fourth type signal is a different type of short range broadcast signal, e.g., beacon, than the second second type signal, e.g., using one of: a Bluetooth, BLE, 802.15.4, or 802.11ad protocol.

Figure 11:
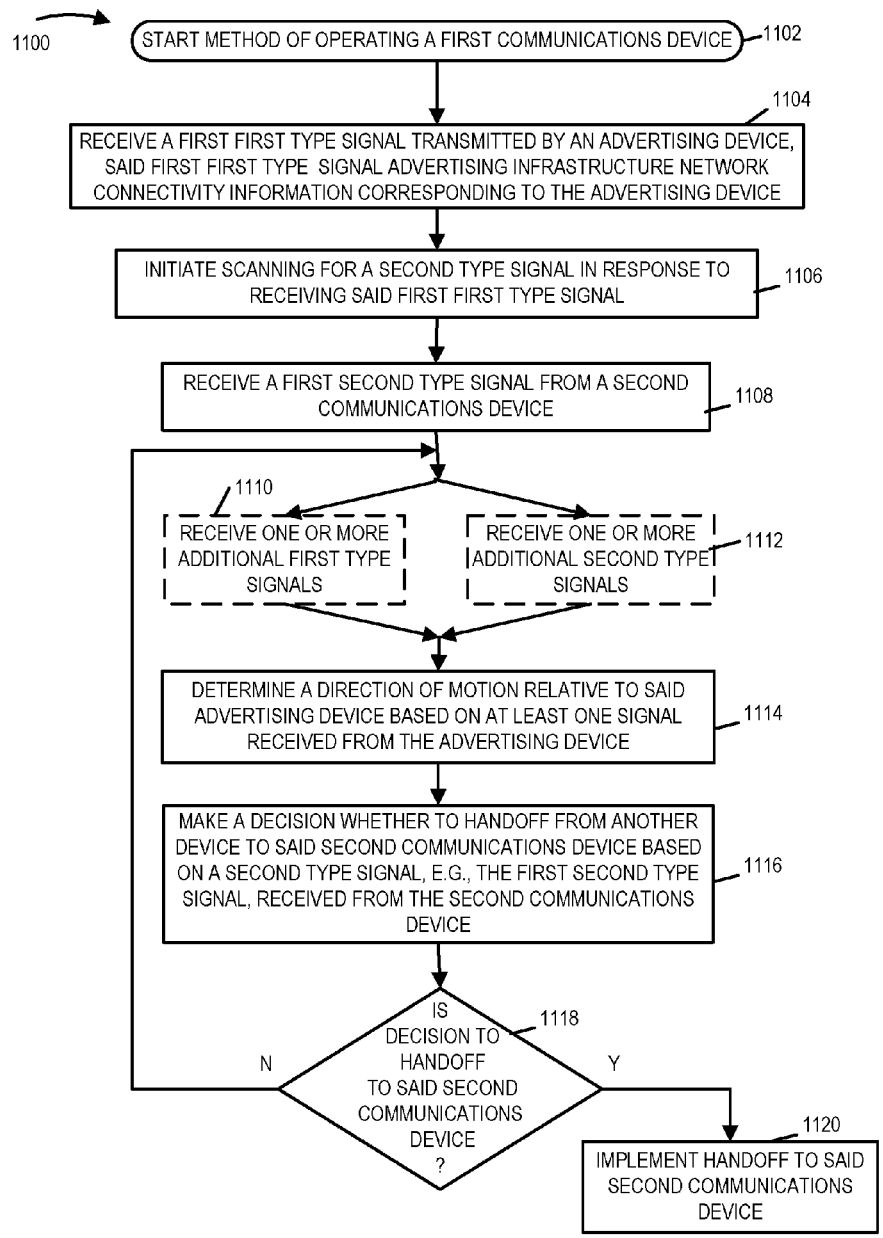
FIG. 11 is a flowchart of an exemplary method of operating a first communications device in accordance with various exemplary embodiments.

FIG. 11 is a flowchart 1100 of an exemplary method of operating a first communications device in accordance with various exemplary embodiments. The first communication device is, e.g., device 1300 of FIG. 13. In one embodiment, the first communications device is a device with device to device capability which can received LTE-D beacons and WiFi beacons. Operation starts in step 1102 and proceeds to step 1104. In step 1104 the first communications device receives a first first type signal, e.g., an LTE-D beacon, transmitted by an advertising device, said first first type signal advertising infrastructure, e.g., cellular, network connectivity information corresponding to the adverting device. In some embodiments, the advertising device is a gateway device or an intermediate device that transmits an LTE-D beacon. Operation proceeds from step 1104 to step 1106.

In step 1106 the first communications device initiates scanning for a second type signal, e.g., a WiFi signal, in response to receiving said first type of signal. In some such embodiments, the second type signal is a broadcast signal, e.g., a WiFi beacon signal. Operation proceeds from step 1106 to step 1108, in which the first communications device receives a first second type signal from a second communications device. In some embodiments, operation proceeds from step 1108 to one or both of optional steps 1110 and 1112. In other embodiments, operation proceeds from step 1108 to step 1114.

In step 1108 the first communications device receives one or more additional first type signals, e.g., from the advertising device. In step 1112 the first communications device receives one or more additional second type signals, e.g., from the second communications device. Operation proceeds from step 1110 and/or step 1112 to step 1114.

In step 1114 the first communications device determines a direction of motion relative to said advertising device based on at least one signal received from the advertising device. For example, the first communications device determines the direction of motion based on said first first type signal but also potentially other first type signals. For example, the direction of motion is determined based on the received first first type signal, e.g., a first LTE-D beacon received in step 1104 and other first type signals, e.g., additional LTE-D beacons received from the advertising device in step 1110, e.g., each additional LTE-D beacon from the advertising device being received at a different time subsequent to the received first first type signal. In another example, the direction of motion is determined based multiple second type signals received from the advertising device, e.g., multiple WiFi beacons received from the advertising device at different times in step 1112. In still another embodiment, the direction of motion is determined based on multiple first type signal, e.g. multiple LTE-D beacons, and multiple second type signals, e.g., multiple WiFi beacons, received from the advertising device, e.g., at different times. Operation proceeds from step 1114 to step 1116.

In step 1116, the first communications device makes a decision whether to handoff from another device to said second communications device based on a second type signal, e.g., the first second type signal, received from the second communications device. In some embodiments, the decision of step 1116 whether or not to make a handoff to the second communications device is further based on said determined direction of motion relative to said advertising device. In some embodiments, for the first communications device to decide to make a handoff the second communications device the first communications device satisfies the conditions that the first communications device is determined to be moving in a direction toward the advertising device and the received signal strength of a second type signal from the second communications device is above a predetermined threshold. Operation proceeds from step 1116 to step 1118.

In step 1118 if the decision is to handoff the said second communications device, then operation proceeds from step 1118 to step 1120 in which the first communications device implements the handoff to said second communications device. However, if the decision is not to handoff to the second communications device, then operation proceeds from step 1118 to the input of step 1110 and 1112.

Figure 12:
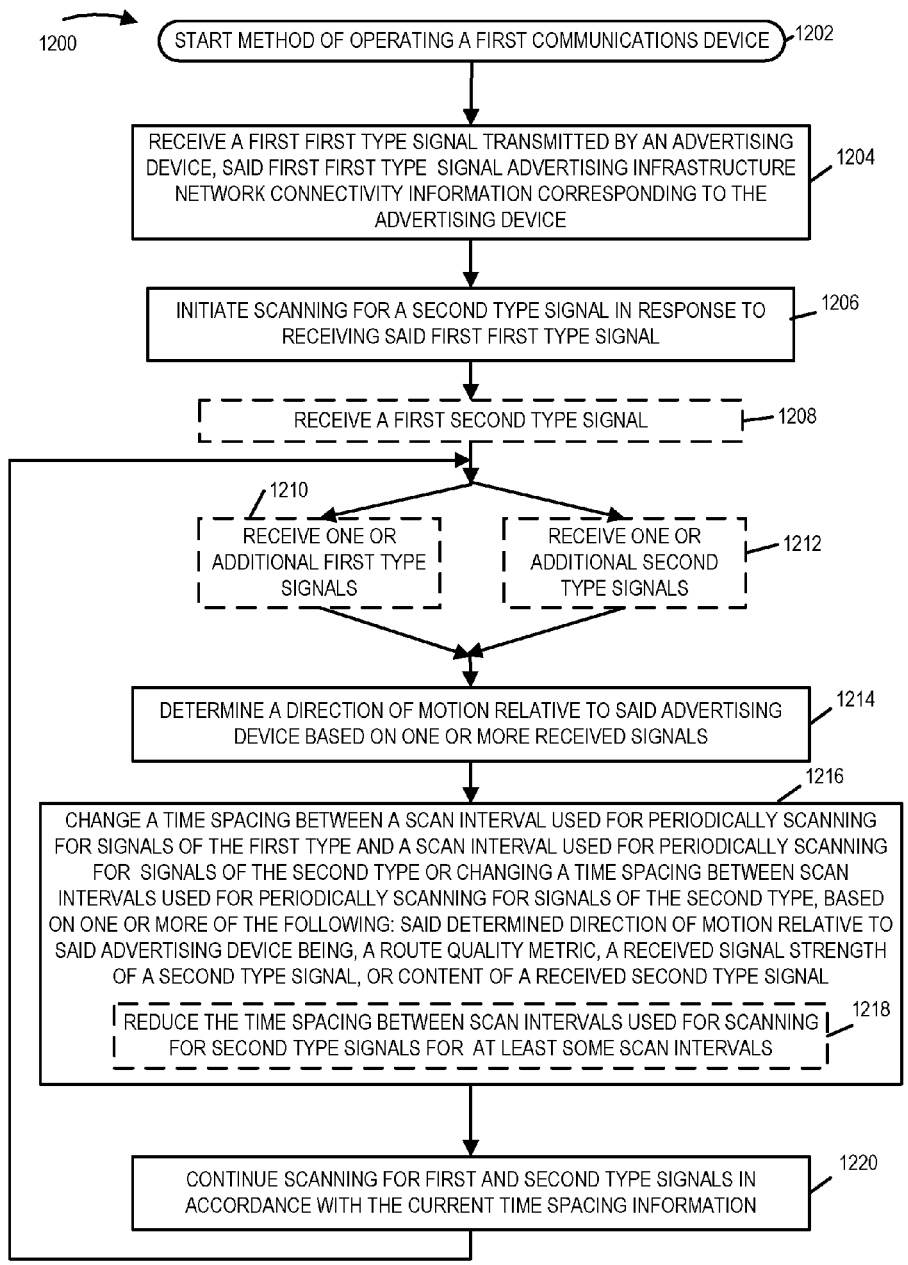
FIG. 12 is a flowchart of an exemplary method of operating a first communications device in accordance with various exemplary embodiments.

FIG. 12 is a flowchart 1200 of an exemplary method of operating a first communications device in accordance with various exemplary embodiments. The first communication device is, e.g., device 1300 of FIG. 13. In one embodiment, the first communications device is a device with device to device capability which can received LTE-D broadcast signals including beacons and WiFi broadcast signals including WiFi beacon frames and WiFi action frames. Operation starts in step 1202 and proceeds to step 1204. In step 1204 the first communications device receives a first first type signal, e.g., a LTE-D beacon, transmitted by an advertising device, said first first type signal advertising infrastructure network connectivity information corresponding to the adverting device. Operation proceeds from step 1204 to step 1206.

In step 1206 the first communications device initiates scanning for a second type signal, e.g., a WiFi beacon signal, in response to receiving said first type of signal. Operation proceeds from step 1206 to optional step 1208, to one or both of optional steps 1210 and 1212, or to step 1214. In step 1208 the first communications device receives a first second type signal, e.g., from a second communications device. In some embodiments, operation proceeds from step 1208 to one or both of optional steps 1210 and 1212. In other embodiments, operation proceeds from step 1208 to step 1214.

In step 1210 the first communications device receives one or more additional first type signals, e.g., from the advertising device. In step 1212 the first communications device receives one or more additional second type signals, e.g., from the second communications device. Operation proceeds from step 1210 and/or step 1212 to step 1214.

In step 1214 the first communications device determines a direction of motion relative to said advertising device based on one or more received signals. For example, in one embodiment, the first communications device determines a direction of motion relative to the advertising device based on multiple LTE-D beacons received from the advertising device. In another embodiment, the first communications device determines a direction of motion relative to the advertising device based on multiple WiFi beacons received from the advertising device. In yet another embodiment, the first communications device determines a direction of motion relative to the advertising device based on multiple LTE-D beacons and WiFi beacons received from the advertising device. Operation proceeds from step 1214 to step 1216. In step 1216 the first communications device changes a time spacing between a scan interval used for periodically scanning for signals of the first type and a scan interval used for periodically scanning for signals of the second type or changes a time spacing between scan intervals used for periodically scanning for signals of the second type, based on one or more of the following: said determined direction of motion relative to said advertising device, a route quality metric, e.g., a current route quality metric, a received signal strength of a second type signal, e.g., a received signal strength of said second second type signal, or content of a second type signal. In some embodiments, step 1216 includes step 1218 in which the first communications device reduces the time spacing between scan intervals used for scanning for second type signals for at least some scan intervals. In some embodiments, when the determined direction of motion indicates that the first communications device is moving closer to the potential next hop device, the time spacing between scanning for second type signal is reduced to scan more aggressively to quickly sense when the next hop device comes in range, e.g., WiFi range, of the first communications device. In some embodiments, the time spacing between scan intervals used for scanning for second type signals for at least some scan intervals is reduced in response to a determination that the determined direction of motion relative to the adverting device is a direction toward the advertising device. In some embodiments, the time spacing between scan intervals used for scanning for second type signals for at least some scan intervals is reduced in response to a determination that a received signal strength of a second type signal is below a first threshold, e.g., start scanning aggressively to search for a new next hop device when the second type signal from the current next hop device is determined to be fading. In some embodiments, the time spacing between scan intervals used for scanning for second type signals for at least some scan intervals is reduced in response to a determination that a current route quality metric is below a threshold, e.g., scan aggressively when the current route quality is determined to be below a threshold, said threshold being slightly above the route break threshold.

Operation proceeds from step 1216 to step 1220 in which the first communications device continues scanning for first and second type signals in accordance with the current time spacing information. Operation proceeds from step 1220 to the inputs of steps 1210 and 1212.

FIG. 13 is a drawing of an exemplary communications device 1300, e.g., a user equipment device in accordance with various exemplary embodiments. Exemplary communications device 1330 is, e.g., a communications device with device to device capability which can receive LTE-D beacons and WiFi beacons. Exemplary communications device 1300 is, e.g., a communications device, e.g., a first communications device, implementing the method of flowchart 600 of FIG. 6, the method of flowchart 700 of FIG. 7, the method of flowchart 900 of FIG. 9, the method of flowchart 1000 of FIG. 10, the method of flowchart 1100 of FIG. 11 and/or the method of flowchart 1200 of FIG. 12.

Exemplary communications device 1300 includes an LTE network interface 1302 including a LTE cellular interface 1304 and a LTE Direct (LTED) interface 1306, a WIFI network interface 1308, a Bluetooth (BT) network interface 1310, a Bluetooth low energy (BLE) network interface 1312, additional wireless interfaces 1313, e.g., other WPAN interfaces, etc., a wired interface 1358, a 802.11 ad interface 1366, a 802.15.4 interface 1372, a GPS Module 1380, an input device 1342, an output device 1344, a processor 1346, e.g., a CPU, a memory 1348, and an assembly of modules 1350, e.g., an assembly of hardware modules, e.g., circuits, coupled together via a bus 1364 over which the various elements may interchange data and information.

LTE cellular interface 1304 includes a cellular receiver ($RX_C$) 1314 and a cellular transmitter ($TX_C$) 1316 coupled to antenna 1334, via which device 1300 may receive and transmit cellular wireless signals, respectively. LTE direct (LTE-D) interface 1306 includes a LTE direct receiver ($RX_{LTED}$) 1318 and a LTE direct transmitter ($TX_{LTED}$) 1320 coupled to antenna 1334, via which device 1300 may receive and transmit LTE direct wireless signals, respectively. LTE direct wireless signals include LTED beacons.

WIFI interface 1308 includes a WIFI receiver ($RX_{WIFI}$) 1322 and a WIFI transmitter ($TX_{WIFI}$) 1324 coupled to antenna 1336, via which device 1300 may receive and transmit WIFI wireless signals, respectively. WIFI wireless signals include WIFI signals communicating WiFi beacon frames and WiFi action frames.

BT interface 1310 includes a BT receiver ($RX_{BT}$) 1326 and a BT transmitter ($TX_{BT}$) 1328 coupled to antenna 1338, via which device 1300 may receive and transmit BT wireless signals, respectively. BT wireless signals include BT beacons. BLE interface 1312 includes a BLE receiver ($RX_{BLE}$) 1330 and a BLE transmitter ($TX_{BLE}$) 1332 coupled to antenna 1340, via which device 1300 may receive and transmit BLE wireless signals, respectively. BLE wireless signals include BLE beacons. Additional interfaces 1313 includes one or more receivers and one or more transmitters and is coupled to antenna 1341, via which device 1300 may receive and transmit wireless signals including beacon signals. In some embodiments, a different number of antenna are used and/or a different antenna configuration is used, e.g., a different antenna for receive and transmit, multiple antennas for receive and multiple antennas for transmit, the same antenna or same set of antennas for different interfaces, etc. In some embodiments, different numbers of antennas are used for at least some different interfaces.

Wired interface 1358 includes a receiver $RX_W$ 1360 and a transmitter $TX_W$ 1362, via which device 1300 may receive and transmit signals over the Internet and/or to other network nodes, e.g., via a wired and/or fiber optic backhaul link or links. 802.11ad interface 1366 includes a receiver $RX_{80211ad}$ 1368 and a transmitter $TX_{80211ad}$ 1370, coupled to antenna 1369, via which device 1300 may receive and transmit signals, respectively, including, e.g. 802.11ad beacons.

802.15.4 interface 1372 includes a receiver $RX_{802154}$ 1374 and a transmitter $TX_{802154}$ 1376 coupled to antenna 1375 via which device 1300 may receive and transmit signals, respectively, including, e.g., 802.15.4 beacons.

Input device 1342 includes, e.g., touch screen interface, keypad, keyboard, microphone, camera, switches, monitoring sensors, etc., via which a user of device 1300 may input information and/or device 1300 may autonomously or semi autonomously collect data.

Output device 1344 includes, e.g., a display, a speaker, etc., for outputting data/information to a user of device 1300. Memory 1348 includes routines 1352 and data/information 1356. Routines 1352 include an assembly of modules 1354, e.g., an assembly of software modules. Data/information 1356 includes, e.g., received first and second type signals, information received from received first and second type signal including infrastructure network connectivity information, generated first, second, third and fourth type signals, updated network connectivity information, routing information, e.g. routing table information, information identifying alternative gateways and quality information associated with alternative gateways, a current routing path, alternative routing paths, quality information associated with a routing path, determined direction information, and thresholds, e.g., a route break threshold, a route quality threshold used for triggering changes in time spacing between scans for second type signals, a received signal power threshold, e.g., corresponding to a received second type signal used for determining when to change time spacing between scans for second type signals.

Figure 14A:
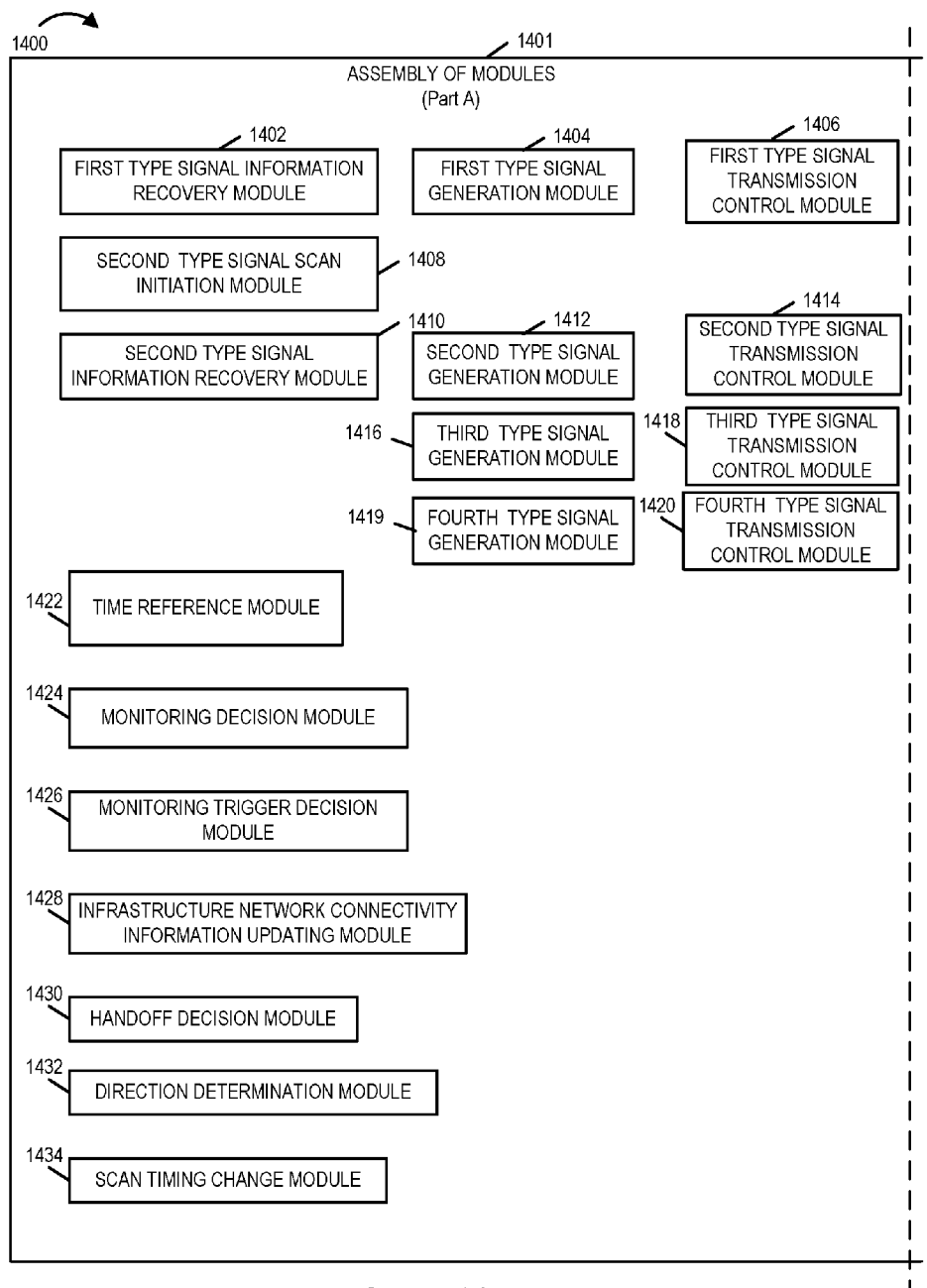
FIG. 14A is a first part of an assembly of modules which may be included in the exemplary communications device of FIG. 13.
Figure 14B:
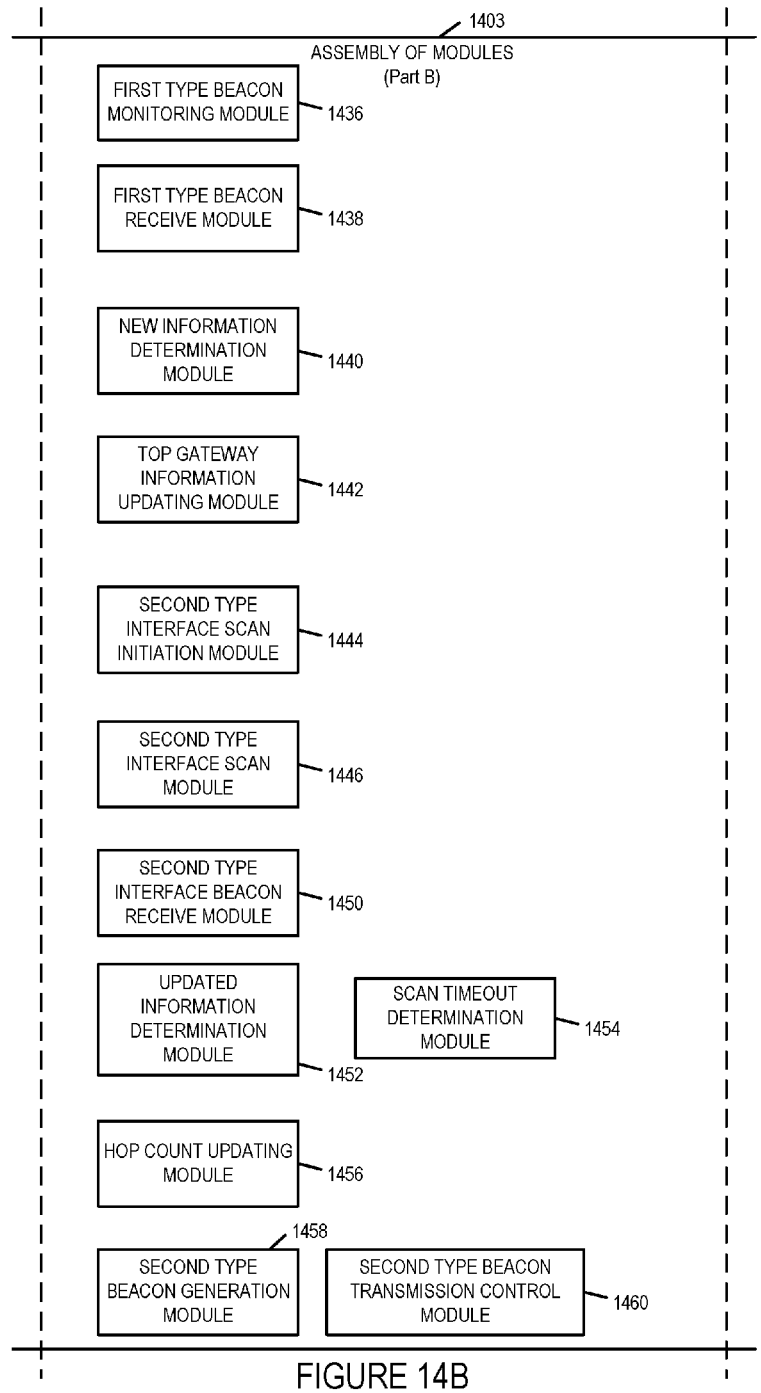
FIG. 14B is a second part of an assembly of modules which may be included in the exemplary communications device of FIG. 13.

FIG. 14 is a drawing of an assembly of modules 1400, which may be included in an exemplary communications device, e.g., communications device 1300 of FIG. 13, in accordance with an exemplary embodiment. Assembly of modules 1400 can, and in some embodiments is, used in the communications device 1300. The modules in the assembly of modules 1400 can, and in some embodiments are, implemented fully in hardware within the processor 1346, e.g., as individual circuits. The modules in the assembly of modules 1400 can, and in some embodiments are, implemented fully in hardware within the assembly of modules 1350, e.g., as individual circuits corresponding to the different modules. In other embodiments some of the modules are implemented, e.g., as circuits, within the processor 1346 with other modules being implemented, e.g., as circuits within assembly of modules 1350, external to and coupled to the processor 1346. As should be appreciated the level of integration of modules in the processor and/or with some modules being external to the processor may be one of design choice.

Alternatively, rather than being implemented as circuits, all or some of the modules may be implemented in software and stored in the memory 1348 of the communications device 1300, with the modules controlling operation of communications device 1300 to implement the functions corresponding to the modules when the modules are executed by a processor, e.g., processor 1346. In some such embodiments, the assembly of modules 1400 is included in the memory 1348 as assembly of modules 1354. In still other embodiments, various modules in assembly of modules 1400 are implemented as a combination of hardware and software, e.g., with another circuit external to the processor providing input to the processor 1446 which then under software control operates to perform a portion of a module's function. While shown in the FIG. 13 embodiment as a single processor, e.g., computer, it should be appreciated that the processor 1346 may be implemented as one or more processors, e.g., computers.

When implemented in software the modules include code, which when executed by the processor 1346, configure the processor 1346 to implement the function corresponding to the module. In embodiments where the assembly of modules 1400 is stored in the memory 1348, the memory 1348 is a computer program product comprising a computer readable medium comprising code, e.g., individual code for each module, for causing at least one computer, e.g., processor 1346, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 14 control and/or configure the communications device 1300 or elements therein such as the processor 1346, to perform the functions of corresponding steps illustrated in the method of one or more of the signaling drawings of FIG. 2, 3, 4, 5, 7, 8, and/or one or more of the flowcharts of FIGS. 6, 9, 10, 11 and 12, and/or described with respect to any of the Figures. Thus the assembly of modules 1400 includes various modules that perform functions of corresponding steps of one or more of FIGS. 6, 9, 10, 11 and/or 12.

Assembly of modules 1400 includes a first type signal information recovery module 1402, a first type signal generation module 1404, and a first type signal transmission control module. In various embodiments, the first communications device, e.g. device 1300 of FIG. 13, includes assembly of modules 1400 and further includes a first type signal interface, e.g., an LTE-D interface 1306, configured to receive, e.g., via its receiver, e.g., LTE-D receiver 1318, first type signals including a first first type signal transmitted by an advertising device, e.g., a gateway or an intermediate device that transmits a first type signal, e.g., an LTE-D beacon, said first first type signal, e.g, an LTE-D beacon, advertising infrastructure, e.g., cellular, e.g. LTE cellular, network connectivity information corresponding to the advertising device. First type signal information recovery module 1402 is configured to recover information communicated in a received first type signal, e.g., the first first type signal, said information including infrastructure network connectivity information.

In various embodiments, the first type signal is a broadcast signal or a multicast signal. In some such embodiments, a first type signal is a wireless broadcast signal communicating a beacon signal, e.g., a beacon frame. In various embodiments, the infrastructure network connectivity information includes quality information about a communication path used by said advertising device to connect to the infrastructure network. In some such embodiments, said quality information includes information about a connection between a gateway device used by the advertising device and the infrastructure network. In some such embodiments, said infrastructure network connectivity information includes one or more of the following: information indicating a number of peer to peer hops between the advertising device and the gateway device; information on quality of said peer to peer hops between the advertising device and the gateway device; information indicating a mobility level of the advertising device; information identifying the infrastructure network, e.g. identifying the operator of the network; or information indicating a type, e.g. number of antennas coupled to the gateway device, UE category, etc., of the gateway device.

In some embodiments, said connection is a single hop connection to the infrastructure network. In some embodiments, said advertising device and said gateway are the same device, and wherein said path is a single hop connection to the infrastructure network.

First type signal generation module 1404 is configured to generate first type signals, e.g., LTE-D beacons, said generated first type signals including a second first type signal. In one example, the first type signal generation module 1404 is configured to generate a second first type signal, e.g., an LTE-D beacon, based on information from the received first first type signal. In another example, the first type signal generation module 1404 is configured to generate a second first type signal, e.g., an LTE-D beacon, based on information from the received first first type signal and information from the received first second type signal. First type signal transmission control module 1406 is configured to control the first type signal interface, e.g., LTE-D signal interface 1306, of first communications device to transmit a generated first type signal, e.g., the second first type signal. Information included in the generated second first type signal includes, e.g., updated infrastructure network connectivity information. Thus the first type signal interface, e.g., LTE-D interface 1306, is configured to transmit, e.g., via its transmitter, e.g., LTE-D transmitter 1320, a second first type signal, e.g. an LTE-D beacon, advertising said updated network connectivity information corresponding to the first communications device.

Assembly of modules 1400 further includes a second type signal scan initiation module 1408, a second type signal information recovery module 1410, a second type signal generation module 1412 and a second type signal transmission control module 1414. Second type signal scan initiation module 1408 is configured to initiate scanning for a second type signal in response to receiving said first first type signal. In some embodiments, the decision to scan is conditional based on additional factors in addition to the reception of the first first type signal. In various embodiments, the first communications device, e.g., device 1300 of FIG. 13, includes assembly of modules 1400 and further includes a second type signal interface, e.g., WiFi interface 1308, configured to receive second type signals including a first second type signal. In some embodiments, the first second type signal is a WiFi beacon communicating a WiFi beacon frame or a signal communicating a WiFi action frame. Second type signal information recovery module 1410 is configured to recover information, e.g., network connectivity information, communicated in the received second type signals, e.g., the received first second type signal. Second type signal generation module 1412 is configured to generate second type signals including a second second type signal, e.g., a WiFi signal communicating a WiFi beacon frame a WiFi action frame, advertising updated network connectivity information corresponding to the first communications device. In various embodiments, the generated second second type signal is based on information included in the received first first type signal and the received first second type signal.

The second type signal interface, e.g., WiFi interface 1308, is further configured to transmit generated second type signals, e.g., a second second type signal, e.g., a WiFi signal communicating a WiFi beacon or a WiFi action frame, advertising updated network connectivity information corresponding to the first communications device. Second type signal transmission control module 1414 is configured to control the second type signal interface, e.g., WiFi interface 1308, to transmit generated second type signals including a generated second second type signal.

In some embodiments, a first type signal, e.g., a LTE-D beacon signal, has a longer transmission range than a second type signal, e.g., a WiFi beacon signal. In some embodiments, said first type signal is a wireless broadcast signal that corresponds to a first communications protocol, and said second type signal is a second wireless broadcast signal that corresponds to a second communications protocol. In some such embodiments, the first communications protocol is an LTE-D communications protocol and the second communications protocol is a WiFi communications protocol.

In various embodiments, the first communications device, e.g. device 1300 of FIG. 13, includes assembly of modules 1400 and further includes a third type signal interface, e.g., additional interface 1313, configured to transmit third type signals including a first third type signal, e.g., a long range beacon which is a different type than an LTE-D beacon, advertising updated network connectivity information corresponding to the first communications device. Assembly of modules 1400 further includes a third type signal generation module 1416 and a third type signal transmission control module 1418. Third type signal generation module 1416 is configured to generate third type signals including a first third type signal advertising updated network connectivity information. Third type signal transmission control module 1418 is configured to control the third type interface, e.g. interface 1313, to transmit generated third type signals including the generated first third type signal, e.g., a long range beacon advertising updated network connectivity information corresponding to the first communications device.

In various embodiments, the first communications device, e.g. device 1300 of FIG. 13, includes assembly of modules 1400 and further includes a fourth type signal interface, e.g., one of: BT interface 1310, BLE interface 1312, IEEE 802.11ad interface 1366, and 802.14.4 interface 1372, configured to transmit fourth type signals including a first fourth type signal, e.g., a short range beacon which is a different type than a WiFi beacon, advertising updated network connectivity information corresponding to the first communications device. Assembly of modules 1400 further includes a fourth type signal generation module 1419 and a fourth type signal transmission control module 1420. Fourth type signal generation module 1419 is configured to generate fourth type signals including a first fourth type signal advertising updated network connectivity information corresponding to the first communications device. Fourth type signal transmission control module 1420 is configured to control the fourth type interface to transmit generated fourth type signals including the generated first fourth type signal, e.g., a short range beacon advertising updated network connectivity information corresponding to the first communications device.

Assembly of modules 1422 further includes a time reference module 1422, a monitoring decision module 1424, a monitoring trigger decision module 1426, an infrastructure network connectivity information updating module 1428, a handoff decision module 1430, a direction determination module 1432, an a scan timing change module 1434. Time reference module 1422 is configured to maintain a time reference, e.g., one of a global or cellular time reference. In some embodiments, the global time reference is a GPS time based on GPS signals received, e.g., via GPS receiver 1382 of GPS module 1380. In various embodiments, a first type signal is synchronized to said time reference. In some such embodiments, a second type signal, e.g., a WiFi beacon signal, is unsynchronized or synchronized to a lesser degree than a first type signal, e.g., a LTE-D beacon signal. In various embodiments, second type signals may have jitter or occur at less predictable times relative to a global timing reference than first type signals.

Monitoring decision module 1424 is configured to make a decision whether to switch from monitoring for second type signals during monitoring intervals which occur at a first time spacing to monitoring, without waiting for the occurrence of one of said monitoring intervals, e.g., start monitoring immediately, for second type signals based on the content of said received first first type signal. In some such embodiments, the monitoring decision module 1424 makes the decision based on whether infrastructure network connectivity information included in the received first first type signal indicates better infrastructure network connectivity than is presently available to the first communications device.

Monitoring trigger decision module 1426 is configured to make a decision whether to trigger monitoring for second type signals based on whether or not the infrastructure network connectivity information included in the received first first type signal indicates better infrastructure network connectivity than is presently available to the first communications device. In some such embodiments, first and second type signals are beacon signals, e.g., LTE-D beacon signals and WiFi beacon signals. In some embodiments, the monitoring trigger decision module 1426 is configured to decide to trigger monitoring when received network connectivity information indicates better infrastructure network connectivity than is presently available to the first communications device.

Infrastructure network connectivity updating module 1428 is configured to update infrastructure network connectivity information corresponding to the first communications device based on information in said received first first type signal. Infrastructure network connectivity updating module 1428 is further configured to update infrastructure network connectivity information corresponding to the first communications device based on information in said received first second type signal.

Handoff decision module 1430 is configured to make a decision whether to handoff from another device to a second communications device based on said first second type signal received from the second communications device.

Direction determination module 1432, in some embodiments, is configured to determine a direction of motion of said first communications device relative to said advertising device based on at least one signal received from the advertising device. For example, the direction determination module 1432 determines a direction of motion based on (i) said first first type signal, e.g., an LTE-D beacon, received from the advertising device and (ii) other first type signals, e.g., other LTE-D beacons, received from the advertising device. In another example, the direction determination module 1432 determines a direction of motion based on multiple second type signals, e.g., multiple WiFi beacons, received from the advertising device. In still another example, the direction determination module 1432 determines a direction of motion based on multiple first type signals, e.g., LTE-D beacons, and multiple second type signals, e.g., multiple WiFi beacons, received from the advertising device.

Direction determination module 1432, in some embodiments, is configured to determine a direction of motion of said first communications device relative to said advertising device based on one or more signals, e.g., one or more signals received from the advertising device. In some such embodiments, the one or more signals are: multiple LTE-D beacons received from the advertising device, multiple WiFi beacons received from the advertising device, or multiple LTE-D and WiFi beacons received from the advertising device.

Scan timing change module 1434 is configured to change: (i) a time spacing between a scan interval used for periodically scanning for signals of the first type, e.g., LTE-D beacons, and a scan interval used for scanning for signals of the second type, e.g., WiFi beacons, or (ii) a time spacing between scan intervals used for periodically scanning for signals of the second type, e.g., WiFi beacons, based on one or more of the following: (i) a determined direction of motion of said first communications device relative to said advertising device, (ii) a received signal strength of said second type signal, or (iii) content of said second type signal. For example, in one embodiment, as the first communications device moves closer to the potential next hop device and determines that the direction of motion is toward the advertising device, the scan timing change module 1434 reduces the time spacing between second type scan intervals to scan more aggressively so that the first communications device can quickly sense when it comes into WiFi range.

In some embodiments, the scan timing change module 1434 is configured to change the time spacing between scan intervals used for scanning for signals of the second type to reduce the time spacing between at least some scan intervals in response to a set of conditions being satisfied, said set of conditions including said determined direction of motion relative to the advertising device being a direction toward the advertising device.

In some embodiments, the scan timing change module 1434 is configured to change the time spacing between scan intervals used for scanning for signals of the second type to reduce the time spacing between at least some scan intervals in response to a set of conditions being satisfied, said set of conditions including said determined direction of motion relative to the advertising device being said received signal strength of a second type signal being above a first threshold. For example, the scan timing change module 1434 changes the scan timing to scan more aggressively when approaching the connection threshold.

Assembly of modules 1400 further includes a first type beacon monitoring module 1436, a first type beacon receive module 1438, a new information determination module 1440, a top gateway information updating module 1442, a second type interface scan initiation module 1444, a second type interface scan module 1446, a second type interface beacon receive module 1450, an updated information determination module 1452, a scan timeout determination module 1454, a hop count updating module 1456, a second type beacon generation module 1458, and a second type beacon transmission control module 1460.

First type beacon monitoring module 1436 is configured to monitor for first type beacons, e.g. LTE-D beacons, e.g., in accordance with first type beacon monitoring intervals synchronized with respect to a global or cellular time reference. First type beacon receive module 1438 is configured to receive first type beacons, e.g., LTE-D beacons advertising infrastructure network connectivity information and recover information communicated in a received first type beacon. New information determination module 1440 is configured to determine if the received first type beacon carries new information and to control operation as a function of the determination. Top gateway information updating module 1442 is configured to update information about the current top gateway based on information in the received first type beacon when the new information determination module determines that the received first type beacon carries new information about the current top gateway. Second type interface scan initiation module 1444 is configured to initiate, e.g., trigger immediate, scanning on a second interface, e.g., a WiFi interface in response to receiving a first type beacon carrying new information about the current top gateway. Second type interface scan module 1446 is configured to perform the scan on the second type interface in response to the scan initiation. Scan timeout determination module 1454 is configured to determine when the time interval for the scan is completed and control operation as a function of the determination. A second type interface beacon signal, e.g., a WiFi beacon may be, and sometimes is, received during the scan before the timeout occurs.

Second type interface beacon receive module 1450 is configured to receive a second type beacon signal, e.g., a WiFi beacon signal, detected during the scan, and recover information communicated in the received second type beacon signal.

Updated information determination module 1452 is configured to determine if a second type beacon with updated information was received during the scan on the second interface, e.g., the WiFi interface, and to control operation as a function of the determination. Hop count updating module 1456 is configured to update the hop count to the current top gateway based on information received in the second type beacon. Second type beacon generation module 1458 is configured to generate a second type beacon, e.g., a WiFi beacon communicating updated infrastructure network connectivity information based on information received in a first type beacon signal, e.g. an LTE-D beacon, and a second type beacon, e.g., a WiFi beacon. Second type beacon transmission control module 1460 is configured to control the second type interface, e.g., WiFi interface, to transmit the generated second type beacon, e.g., generated WiFi beacon, with the updated information.

Assembly of modules 1400 further includes a beacon monitoring module 1462, a beacon receive module 1464, a received signal strength measurement module 1466, a relative motion determination module 1468, an information storage module 1470, a route quality determination module 1472, a route quality ranking module 1474, a current route quality evaluation module 1476, an alternative route availability determination module 1478, a second type signal higher quality availability determination module 1479, a second type signal scan initiation module 1480, a second type signal scan module 1482, a second type signal receive module 1484, a second type signal higher quality route information determination module 1486, a scan timeout module 1488, a new connection initiation module 1490 and a handover module 1492.

Beacon monitoring module 1462 is configured to monitor for beacons from other devices, e.g., LTE-D and WiFi beacons. Beacon receive module 1464 is configured to receive beacons, e.g., LTE-D and WiFi beacons from another device. Received signal strength measurement module 1466 is configured to receive the signal strength of received signals, e.g., the signal strength of received LTE-D beacons and WiFi beacons. In various embodiments, the transmission power corresponding to the received beacons is known or can be determined.

Relative motion determination module 1468 is configured to determine a relative motion of the first communications device including assembly of modules 1400 and the other device which transmitted the received beacons, based on a sequence of received signal strength measurements. Information storage module 1470 is configured to store relative motion information and other information communicated in received beacons fields, e.g., other information including network connectivity information, in memory.

Route quality determination module 1472 is configured to compute the quality of routes, e.g., alternative routes including the current route, in a routing table. Route quality ranking module 1474 is configured to rank the quality of alternative routes in the routing table. Current route evaluation module 1476 is configured to determine if the quality of the current route is below a threshold and to control operation as a function of the determination. Alternative route availability determination module 1478 is configured to determine if there are alternative routes with higher quality than the current route when the current route quality evaluation module 1476 determines that the quality of the current route is the below the threshold. Second type signal higher quality availability determination module 1479 is configured to determine if second type signal, e.g., WiFi, information is available on any higher quality route and to control operation as a function of the determination. New connection initiation module 1440 is configured to start a connection procedure for the best alternative route using the second type signal, e.g., WiFi signal, information, when module 1479 determines that second type signal, e.g. WiFi signal, information of a higher quality route is available.

Second type signal scan initiation module 1480 is configured to initiate a scan for second type signal, e.g., WiFi signal, when module 1479 determines that second type signal information on a higher quality route is not available. Second type signal scan module 1482 is configured to perform the monitoring for second type signal, e.g., monitoring for WiFi beacon signals WiFi action frames, communicating information on a higher quality route. Second type signal, e.g., WiFi, receive module 1482 is configured to receive second type signals. Second type signal higher quality route information determination module 1486 is configured to determine if second type signal information, e.g. WiFi information, of a higher quality route has been received during the scanning and to control operation as a function of the determination. Scan timeout module 1488 is configured to determine when the initiated scan for second type signals, e.g. WiFi scan, has timed out and to control operation as a function of the determination. New connection initiation module 1490 is further configured to start a connection procedure for the higher quality route using the second type signal, e.g., a WiFi signal, information in response to a determination by module 1486 that second type signal information has been received with information of a higher quality route than the current route. Handover module is configured to implement a handover which has been started by new connection initiation module 1490.

The techniques of various embodiments may be implemented using software, hardware and/or a combination of software and hardware. Various embodiments are directed to communications devices included in networks, e.g., device to device networks which include gateway devices and support multiple applications. Various embodiments are directed to apparatus, e.g., a communications device such as a wireless device, e.g., a UE, a smart device, Internet of Things device, including a wireless communications interface, a device including an Ethernet switch, a gateway device, a base station, etc. Various embodiments, are well suited for wireless communications systems supporting D2D signaling including beacons and different technologies, e.g., in combination, e.g., LTE-D and at least one of WWI, BT, BLE, IEEE 802.15.4, and IEEE 802.11ad. Various embodiments are well suited for use in systems including device to device communications networks which use gateways and may include a plurality of network segments, e.g., disjoint network segments each network segment associated with a gateway. Various embodiments are directed to communications systems. Various embodiments are also directed to methods, e.g., a method of operating a communications device. Various embodiments are well suited for embodiments, in which communications devices supports a plurality of communications applications. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, making a connection establishment decision, selecting a communications device, identifying a gateway used by a communications device, making a routing decision, implementing a decision, signal generation, signal transmission, signal reception, signal processing, and/or other steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to an apparatus, e.g., a communications device such as a wireless device, e.g., a UE, including a processor configured to implement one, multiple or all of the steps of one or more methods of the invention.

In some embodiments, the processor or processors, e.g., CPUs, of one or more devices, e.g., of a communications device such as a wireless device, e.g., a UE, smart communications device, a base station, a gateway, etc. are configured to perform the steps of the methods described as being performed by the apparatus. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., such as communications device with a processor which includes a module corresponding to each of the steps of the various described methods performed by the device in which the processor is included. In some but not all embodiments an apparatus, e.g., a communications device includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein.

Various features are directed to a system including multiple communications devices including, for example, multiple wireless devices, e.g., multiple UEs including multiple interfaces and the capability to send and received two or more different types of beacons, multiple gateways, multiple base station, etc. Some devices may be network nodes, e.g. infrastructure network nodes. Some of the devices may be stationary wireless communications devices; other devices may be mobile wireless devices. Some communications devices may be user communications devices, while other devices may be smart communications devices which operate without user input, e.g., in response to sensor detection. In various embodiments the communications devices and/or network nodes or entities are implemented as hardware, e.g., separate devices each including a communications interface for sending and/or receiving signals communicating data or other information, one or more processors and memory. In some embodiments the memory includes data and/or control routines. In at least some embodiments the one or more processors operate under control instructions in the control routine or routines stored in the node's memory. Thus, when executed by the processor, the instructions in the node or other network entity to perform the functions in accordance with one or more of the methods described herein. In some embodiments the processor or processors of individual nodes are special purposed processors, e.g., ASICs, with hardware circuitry which is configured to implement or control the node or network entity in which the special purpose processor is located to implement one or more steps in accordance with a method or methods described herein. In at least some embodiments, circuits and/or other hardware are used to implement the node or method resulting in a fully hardware implemented embodiment.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method of operating a first communications device, the method comprising:
receiving a first first type signal transmitted by an advertising device, said first first type signal advertising infrastructure network connectivity information corresponding to the advertising device;
making a decision, based on content of said received first first type signal, whether to switch from i) monitoring for second type signals during monitoring intervals which occur at a first time spacing to ii) monitoring for second type signals, without waiting for the occurrence of one of said monitoring intervals; and
initiating scanning for a second type signal in response to receiving said first first type signal.

2. The method of claim 1, wherein said infrastructure network connectivity information includes quality information about a communication path used by said advertising device to connect to an infrastructure network.

3. The method of claim 2, wherein said quality information includes information about a connection between a gateway device used by the advertising device and the infrastructure network, said information including a numerical quality metric value.

4. The method of claim 3, wherein said infrastructure network connectivity information includes one or more of the following:
- information indicating a number of peer to peer hops between the advertising device and the gateway device;
- information on quality of said peer to peer hops between the advertising device and the gateway device; or
- information indicating a mobility level of the advertising device.

5. The method of claim 1, wherein a first type signal has a longer transmission range than a second type signal.

6. The method of claim 5, wherein said first type signal is a wireless broadcast signal that corresponds to a first communications protocol and said second type signal is a second wireless broadcast signal that corresponds to a second communications protocol.

7. The method of claims 6 wherein said first type signal is synchronized to a time reference; and
- wherein said second type signal is unsynchronized or synchronized to a lesser degree than said first type signal.

8. The method of claim 1, wherein said first type signal is a wireless broadcast signal that corresponds to a first communications protocol and said second type signal is a second wireless broadcast signal that corresponds to a second communications protocol.

9. The method of claim 1, further comprising:
- updating infrastructure network connectivity information corresponding to the first communications device based on information in said received first first type signal.

10. The method of claim 9, further comprising:
- receiving a first second type signal; and
- updating infrastructure network connectivity information corresponding to the first communications device based on information in said received first second type signal.

11. The method of claim 1, further comprising:
- receiving a first second type signal from a second communications device; and
- making a decision whether to handoff from another device to said second communications device based on said first second type signal received from the second communications device.

12. The method of claim 11, further comprising:
- determining a direction of motion relative to said advertising device based on at least one signal received from the advertising device; and
- wherein said decision whether to handoff is based on said determined direction of motion relative to said advertising device in addition to being based on said first second type broadcast signal.

13. The method of claim 1, further comprising:
- after receiving the first first type signal transmitted by the advertising device, determining a direction of motion relative to said advertising device based on one or more signals; and
- changing a time spacing between a scan interval used for periodically scanning for signals of the first type and a scan interval used for periodically scanning for signals of the second type or changing a time spacing between scan intervals used for periodically scanning for signals of the second type, based on one or more of the following:
said determined direction of motion relative to said advertising device, a current route quality metric, a received signal strength of said second type signal, or content of a received second type signal.

14. A first communications device (1300) comprising:
- a first type signal interface (1306) configured to receive a first first type signal transmitted by an advertising device, said first first type signal advertising infrastructure network connectivity information corresponding to the advertising device;
- a first type signal information recovery module (1402) configured to recover information communicated in a received first first type signal, said information including infrastructure network connectivity information;
- a monitoring decision module (1424) configured to make a decision whether to switch, based on the content of said received first first type signal, from i) monitoring for second type signals during monitoring intervals which occur at a first time spacing to ii) monitoring for second type signals, without waiting for the occurrence of one of said monitoring intervals; and
- a second type signal scan initiation module (1408) configured to initiate scanning for a second type signal in response to receiving said first first type signal.

15. The first communications device (1300) of claim 14, wherein said infrastructure network connectivity information includes quality information about a communication path used by said advertising device to connect to an infrastructure network.

16. The first communications device (1300) of claim 14, wherein said first type signal is a wireless broadcast signal that corresponds to a first communications protocol and said second type signal is a second wireless broadcast signal that corresponds to a second communications protocol.

17. The first communications device (1300) of claim 14, further comprising:
- an infrastructure network connectivity information updating module (1428) configured to update infrastructure network connectivity information corresponding to the first communications device based on information in said received first first type signal.

18. The first communications device (1300) of claim 14, further comprising:
- a second type signal interface (1308) configured to receive a first second type signal from a second communications device; and
- a handoff decision module (1430) configured to make a decision whether to handoff from another device to said second communications device based on said first second type signal received from the second communications device.

19. The first communications device (1300) of claim 14, further comprising:
- a direction determination module (1432) configured to determine a direction of motion relative to said advertising device based on one or more signals; and
- a scan timing change module (1434) configured to change a time spacing between a scan interval used for periodically scanning for signals of the first type and a scan interval used for periodically scanning for signals of the second type or changing a time spacing between scan intervals used for periodically scanning for signals of the second type, based on one or more of the following:
said determined direction of motion relative to said advertising device, a route quality metric, a received signal strength of a second type signal, or content of a received second type signal.

20. A non-transitory machine readable medium (1348) including processor executable instructions which when executed by a processor (1346) of a first communications device (1300), control the first communications device (1300) to perform the steps of:

receiving a first first type signal transmitted by an advertising device, said first first type signal advertising infrastructure network connectivity information corresponding to the advertising device;

making a decision, based on the content of said received first first type signal, whether to switch from i) monitoring for second type signals during monitoring intervals which occur at a first time spacing to ii) monitoring for second type signals, without waiting for the occurrence of one of said monitoring intervals; and initiating scanning for a second type signal in response to receiving said first first type signal.

* * * * *